United States Patent [19]

Byrd et al.

[11] Patent Number: 5,174,611
[45] Date of Patent: Dec. 29, 1992

[54] RELEASABLE COUPLING FOR AIR CARRYING TUBES

[75] Inventors: Gene S. Byrd, Rochester, N.Y.; Daniel Belisaire, Cesson-Sevigne, France; Kenneth H. Podmore, Rush, N.Y.

[73] Assignee: Legris, Incorporated, Rochester, N.Y.

[21] Appl. No.: 702,273

[22] Filed: May 17, 1991

Related U.S. Application Data

[63] Continuation-in-part of Ser. No. 451,740, Dec. 15, 1989, abandoned.

[51] Int. Cl.$^5$ .............................................. F16L 11/00
[52] U.S. Cl. ..................................... 285/45; 285/305; 285/308; 285/323; 285/351; 285/422; 285/906; 285/915; 285/93
[58] Field of Search ............... 265/322, 323, 308, 348, 265/351, 45, 305, 422, 93, 906, 915

[56] References Cited

U.S. PATENT DOCUMENTS

| 3,635,502 | 1/1972 | Burkhalter | 285/348 X |
| 3,909,046 | 9/1975 | Legris | 285/323 X |
| 3,967,838 | 7/1976 | Legris | 285/323 X |
| 3,986,728 | 10/1976 | Marsh | 285/322 X |
| 4,573,716 | 3/1986 | Guest | 285/323 |
| 4,630,848 | 12/1986 | Twist et al. | 285/308 |
| 4,637,636 | 1/1987 | Guest | 285/323 X |
| 4,685,706 | 8/1987 | Kowal | 285/322 |
| 4,712,813 | 12/1987 | Passerell et al. | 285/323 X |
| 4,884,829 | 12/1989 | Funk et al. | 285/351 X |

Primary Examiner—Dave W. Arola
Attorney, Agent, or Firm—Howard J. Greenwald

[57] ABSTRACT

An improved releasable coupling for a tube is disclosed. The coupling contains a socket with at least four stepped bores. Located within the first bore is a compresion means (such as a collar) which has an inner surface inclined to the axis of first bore. A collet is mounted within the compression means and is so configured that, when the collet is caused to move inwardly, the inclined surface of the compression means causes the jaws of the collet to move inwardly. The coupling also contains a tube support located within the second bore. At least four sealing means are disposed within the third bore: a first O-ring is contiguous with a first washer, which in turn is contiguous with a second O-ring, which in turn is contiguous with a second washer.

16 Claims, 19 Drawing Sheets

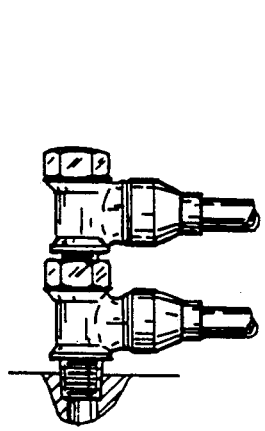
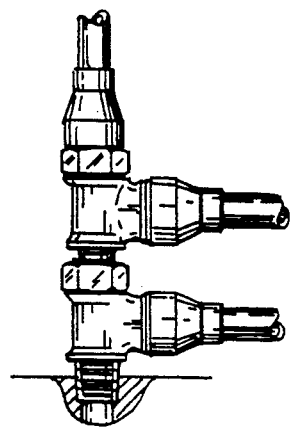
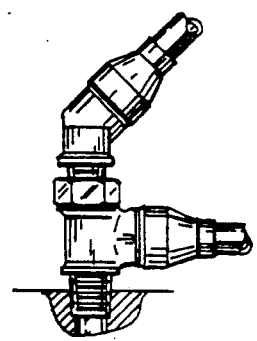
FIG. 35          FIG. 36          FIG. 37
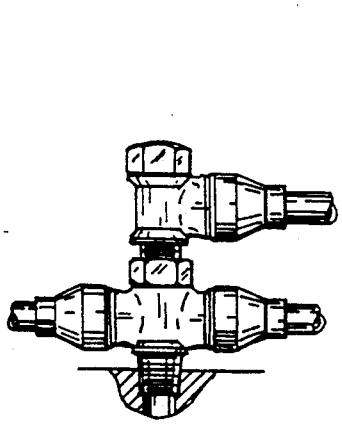
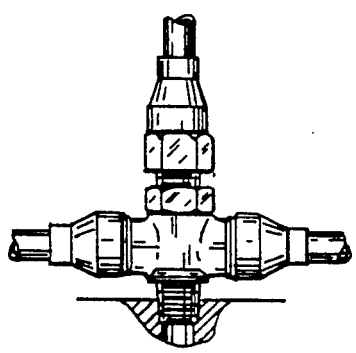
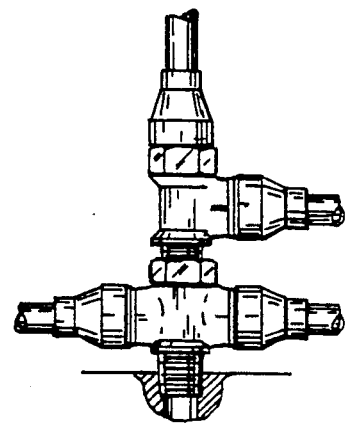
FIG. 38          FIG. 39          FIG. 40
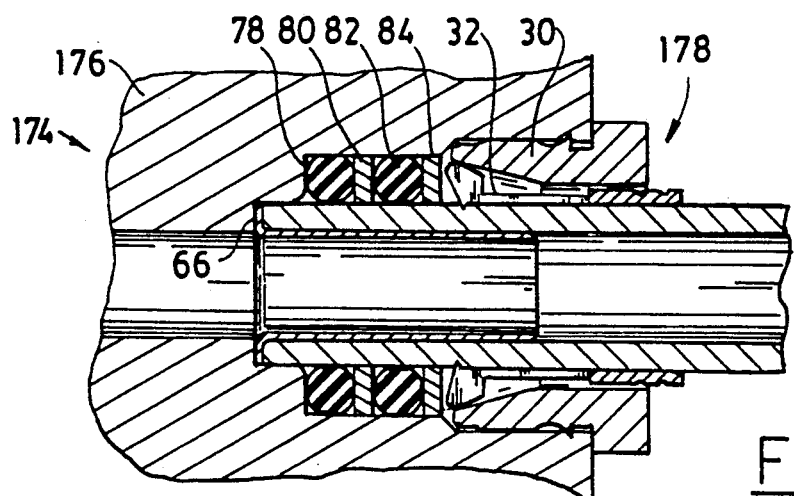
FIG. 41

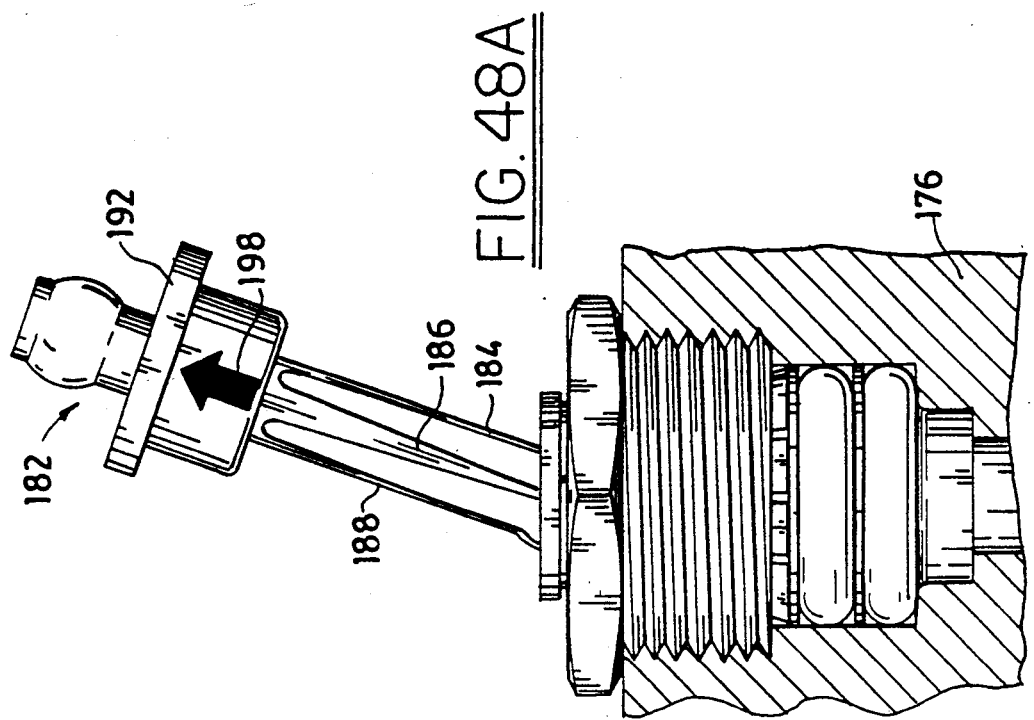
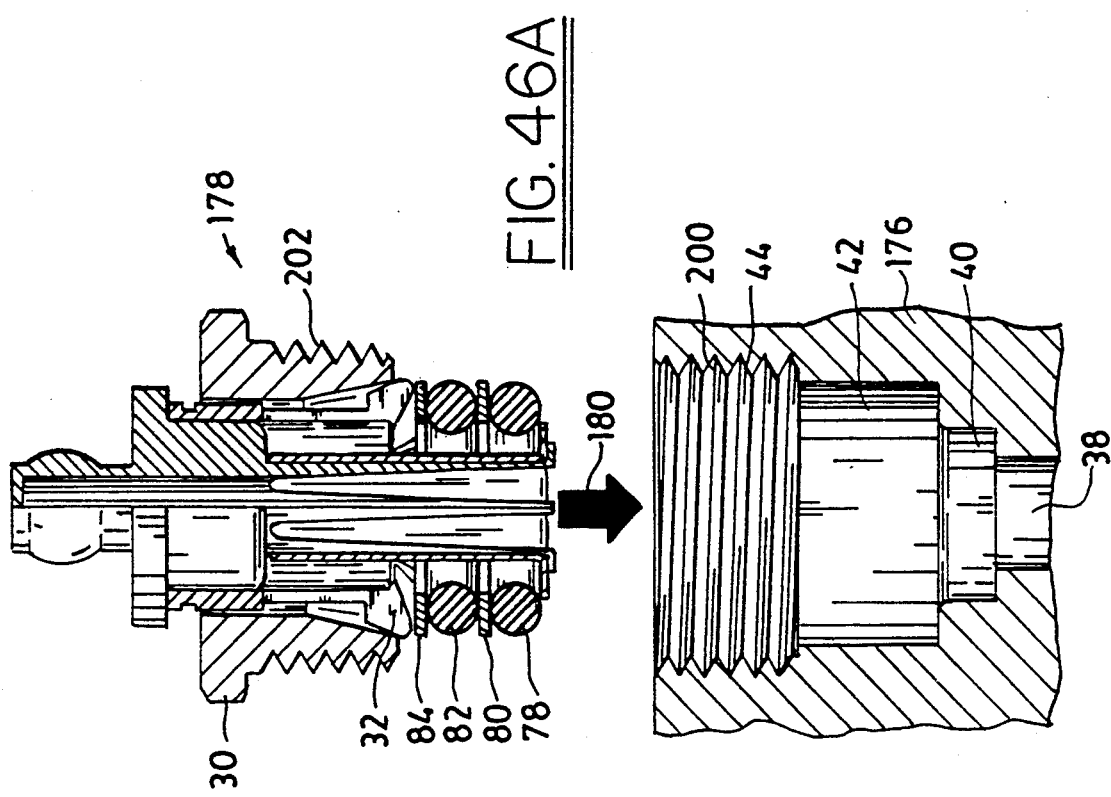

RELEASABLE COUPLING FOR AIR CARRYING TUBES

REFERENCE TO RELATED APPLICATION

This case is a continuation-in-part of applicants, co-pending patent application U.S. Ser. No. 07/451,740, filed on Dec. 15, 1989 and now abandoned. A priority claim for U.S. Ser. No. 07/451,740 was made based upon French application number 8816879, which was filed on Dec. 16, 1988.

FIELD OF THE INVENTION

A push-in fitting assembly for pneumatic air line connections, compatible fluids, and low-pressure hydraulics.

BACKGROUND OF THE INVENTION

U.S. Pat. No. 3,653,689 of Sapy et al. discloses a releasable coupling for a fluid-carrying tube; the entire disclosure of this patent is hereby incorporated by reference into this specification. The coupling of this patent contains means defining first, second, third, and fourth stepped concentric bores, a collar retained in the first bore and having an inner surface inclined to the axis of said bore, and a clamping member mounted within the collar for axial movement relative thereto and having a bore slightly larger than the diameter of the tube. The clamping member contains a plurality of flexible jaws and means o said jaws cooperating with the inclined surface to drive the jaws inwardly upon relative movement between the collar and the jaws to clamp the tube. The coupling also contains a packing ring retained in the second bore to provide a seal between the outer surface of the tube and the wall of the second bore, the third and fourth bores serving to locate the tube.

The coupling of the Sapy patent has found widespread commercial acceptance, especially for the use of connecting semi-rigid plastic tubing to automatic air-control components. However, the prior art discloses that this coupling, and others like it, are not also suitable for liquid applications.

By way of illustration, U.S. Pat. No. 4,304,426 of Robert A. Francis discloses, at lines 19-31 of column 1, that "Australian Patent specification No. 455,164 in the name of S. A. Legris Fils describes a pipe fitting in which a collet or thimble is interposed between the pipe and the body of the fitting. The collet is designed to grip the pipe to prevent it being withdrawn from the fitting and a 'O' ring seal provided in front of the collet seals the connection. Whilst fittings of this type can cater for different pipe diameters using different 'O' rings and collet sizes, testing has shown that such fittings, whilst they may be suitable for small bore high pressure air applications, do not perform satisfactorily when used for liquid applications."

It is an object of this invention to provide a releasable coupling for an air-carrying tube that will also perform satisfactorily when used for liquid applications.

It is another object of this invention to provide a releasable coupling for an air-carrying tube which will have a substantially longer service life than the prior art releasable couplings.

It is yet another object of this invention to provide a releasable coupling for an air-carrying tube which, for any given pressure, has a substantially lower leak rate at high temperatures than the prior art releasable couplings.

It is yet another object of this invention to provide a releasable coupling for an air-carrying tube which, for any given pressure, has a substantially lower leak rate at low temperatures than the prior art releasable couplings.

It is yet another object of this invention to provide a releasable coupling for an air-carrying tube which will require substantially less force to connect and disconnect than prior art releasable couplings.

It is yet another object of this invention to provide a releasable coupling which, after extended use, will require substantially less force to connect and disconnect than prior art releasable couplings.

It is yet another object of this invention to provide a releasable coupling for an air-carrying tube which has substantially greater long-term reliability than prior art releasable couplings.

It is another object of this invention to provide a process for producing a releasable coupling for an air-carrying tube that will also perform satisfactorily when used for liquid applications.

It is another object of this invention to provide a cartridge assembly which may be press-fit into a body containing a multiplicity of stepped bores to produce a releasable coupling for an air-carrying tube that will also perform satisfactorily when used for liquid applications.

It is another object of this invention to provide a cartridge assembly which may be screwed into a body containing a multiplicity of stepped bores to produce a releasable coupling for an air-carrying tube that will also perform satisfactorily when used for liquid applications.

SUMMARY OF THE INVENTION

In accordance with this invention, there is provided a releasable coupling comprised of a body containing a socket that has at least three stepped, concentric bores. Mounted for axial movement within one of the bores is a clamping member with a plurality of flexible jaws and a means for compressing said flexible jaws upon the movement of the clamping member in a specified direction. Mounted within another of the stepped bores are two O-rings and at least one washer separating them. Abutting the shoulder of a third stepped bore is a cylindrical tube support member.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIGS. 35 through 40 describe various coupling networks which may be produced by combining two or more forged fittings, each of which contains at least one structure for making a quick connection with a flexible tube;

FIG. 41 illustrates a coupling produced by inserting a specified cartridge into a body containing a multiplicity of stepped bores;

FIG. 48A illustrates a process for preparing a releasable coupling for an air-carrying tube in which a cartridge is screwed into a body comprised of a multiplicity of stepped bores;

DESCRIPTION OF THE PREFERRED EMBODIMENTS

The coupling of this invention is an improvement upon the coupling described and claimed in U.S. Pat. No. 3,653,689 of Sapy et al., the disclosure of which is hereby incorporated by reference into this specification. However, the new coupling is similar to the Sapy et al. coupling in several respects.

In applicants' new coupling, a socket formed in the wall of a body, (such as a pneumatic distribution component) preferably comprises at least four concentric stepped bores which can be produced by a single machining operation, in a mold, or by other conventional means. In a preferred embodiment of this device, a clamping member having a conical outer face comprises a multiplicity of flexible jaws which can be closed radially by the combined action of the conical face and the divergent portion of a collar, which is drive or screwed into the bore. Each of the jaws has a portion of reduced cross-section to increase its flexibility. Each of the jaws also has a circular, sharp-angled knife-edged portion arranged to bite into the periphery of a semi-rigid plastic tube.

In both applicants' new device and the coupling of Sapy et al., a tube is inserted into the clamping member, the jaws of which are opened out by the slight thrust required to force the tube home against the bottom of the bore. Then, if the tube is pulled in a certain direction, or if the tube is pressurized, the radial force due to the conical configuration of the outer face of the jaw member will cause the jaws to tighten.

Figure 1:
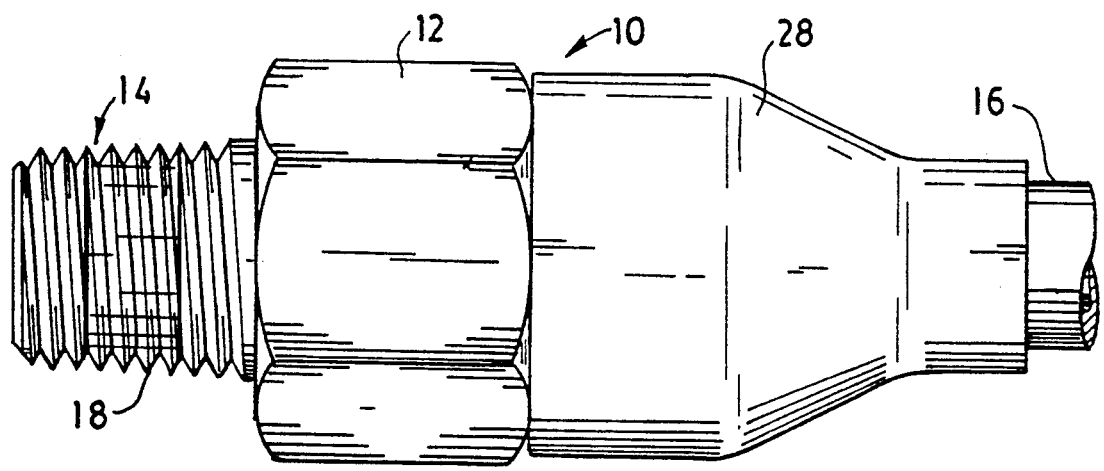
FIG. 1 is side view of one preferred embodiment of the releasable coupling of this invention, with its cover in place.

Referring to FIG. 1, a preferred embodiment of the releasable coupling 10 is comprised of a connector body 12 containing a socket (not shown in FIG. 1). Integrally formed with the connector body 12 is a threaded portion 14. There is an axially tapered portion (not shown in FIG. 1) of the connector body 12 cooperating with the arms of a collet (not shown in FIG. 1) for gripping a tube 16 inserted into the coupling 10, the tapered portion being such that axially outward movement of the collet arms engaging the tapered portion of the socket in the coupling body causes the collet arms to be pressed inwardly to grip a tube in the socket.

In one preferred embodiment, connector body 12 consists essentially of brass. As is known to those skilled in the art, brass is a copper-zinc alloy whose zinc content ranges from about 5 to about weight 40 percent and whose copper content ranges from about 55 to about 95 weight percent. Thus, by way of illustration, one may use wrought red brass (containing 15 percent zinc and 85 percent copper), cast red brass (containing 5 percent zinc, 5 percent lead, 5 percent tin, and 85 percent copper), gilding metal (containing 5 percent zinc and 95 percent copper), commercial bronze (containing 10 percent zinc and 90 percent copper), cartridge 70-30 brass 260 (containing 30 percent zinc and 70 percent copper), architectural bronze 385 (containing 40 percent zinc, 57 percent copper, and 3 percent lead), aluminum brass (containing 22 percent zinc, 76 percent copper, 2 percent aluminum, and a trace of arsenic), yellow brass (containing 35 percent zinc and 65 percent copper), naval brass 464 (containing 39.25 percent zinc, 60 percent copper, and 0.75 percent tin), admiralty brass (containing 28 percent zinc, 71 percent copper, and 1 percent of tin), Muntz metal (containing 40 percent zinc and 60 percent of copper), mixtures thereof, and the like. These alloys are described, e.g., on pages 23-48 to 23-49 of Robert H. Perry et al.'s "Chemical Engineers, Handbook," Fifth Edition (McGraw-Hill Book Company, New York, 1973), the disclosure of which is hereby incorporated by reference into this specification.

In one preferred embodiment, the brass used in applicants' connector body 12 is forging brass. As is known to those skilled in the art, forging brass often contains at least about 55 weight percent of copper and at least about 35 weight percent of zinc. Thus, for example, for brass press forgings a good mixture to use is about 59 percent copper, 39 percent zinc, and 2 percent lead forged at from about 1300 to about 1400 degrees Fahrenheit. Thus, for example, Muntz metal is often used as forging brass.

The threaded portion 14 of connector body 12 is comprised of screw threads 18. In one preferred embodiment, screws threads 18 have a 60 degree thread angle. In another preferred embodiment, the threads are NPTF (National Pipe Thread Fitting) threads.

Figure 4:
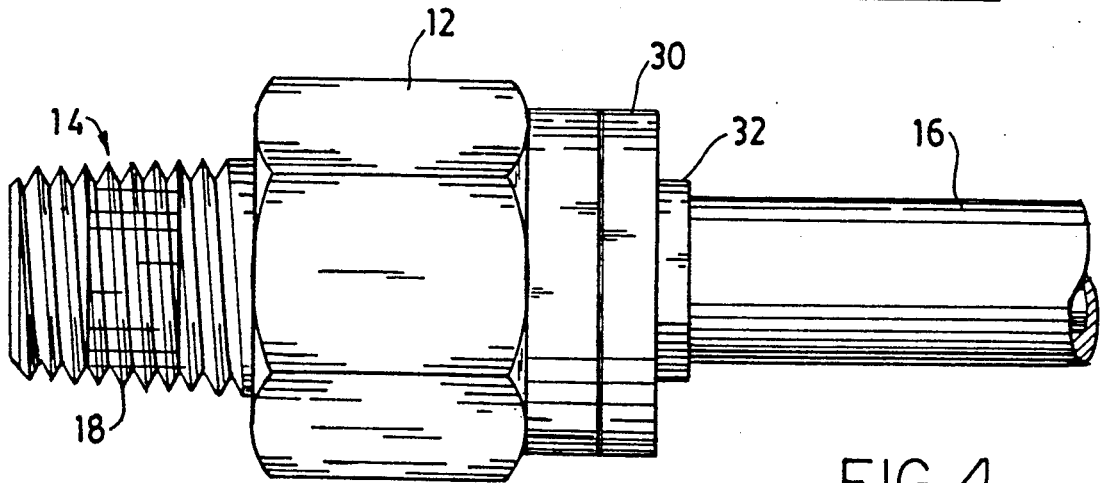
FIG. 4 is a side view of the embodiment of FIG. 1, with its cover removed.

In one preferred embodiment, illustrated in FIGS. 1 and 4, the screw threads 18 on threaded portion 14 contain a thread sealant. Any of the thread sealants known to those skilled in the art may be used on the screw threads. Some of these conventional sealants are described on pages 6-19 to 6-21 of Robert O. Parmley's "Mechanical Components Handbook" (McGraw-Hill Book Company, New York, 1985), the disclosure of which is hereby incorporated by reference into this specification.

By way of illustration, the sealant may used be comprised of epoxy, polyester, polysulfide, polyurethane, epoxy/polysulfide, polyurethane, silicone, acrylic, oleoresin, asphalt, mixtures thereof, and the like. In one preferred embodiment, the sealant used is "EVERSEAL 483," a water-based preapplied sealant available from Legris Incorporated of 244 Paul Road, Rochester, New York 14624.

Figure 2:
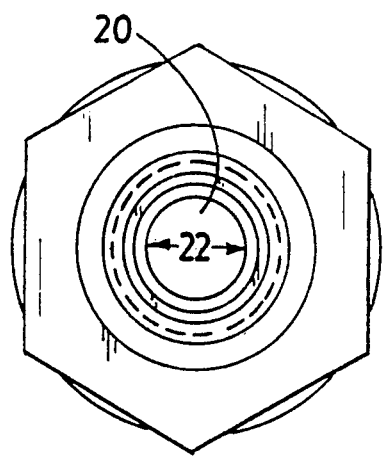
FIG. 2 is a back end view of the embodiment of FIG. 1.

FIG. 2 is an end view of connector body 12, taken while looking at the back of threaded portion 14. Referring to FIG. 2, it will be seen that threaded portion 14 preferably is comprised of a bore 20. In one preferred embodiment, bore 20 has an internal diameter 22 of from about 0.25 to about 0.30 inches and, preferably, from about 0.27 to about 0.28 inches.

Figure 3:
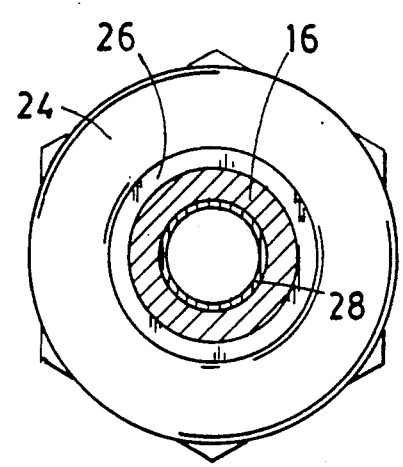
FIG. 3 is a front end view of the embodiment of FIG. 1.

FIG. 3 is an end view of connector body 12, taken while looking at the front of cap 24. Referring to FIG. 3, it will be seen that the coupling 10 is comprised of connector body 12 is comprised of a cap 24 with a reduced diameter section 26, and tube support 28. Tube support 28 facilitates the connection of tube 16 to coupling 10.

The cap 24 is removably attached to connector body 12; it is preferably connected to the connector body 12 by a friction fit. In one embodiment, not shown, cap 24 is removably connected to connector body 12 by being screwed onto said connector body.

Referring to FIG. 4, connector body 12 is shown with cap 24 removed. It will be seen that the connector body 12 is comprised of a threaded portion 14, a sleeve 30, and a collet 32.

Figure 5:
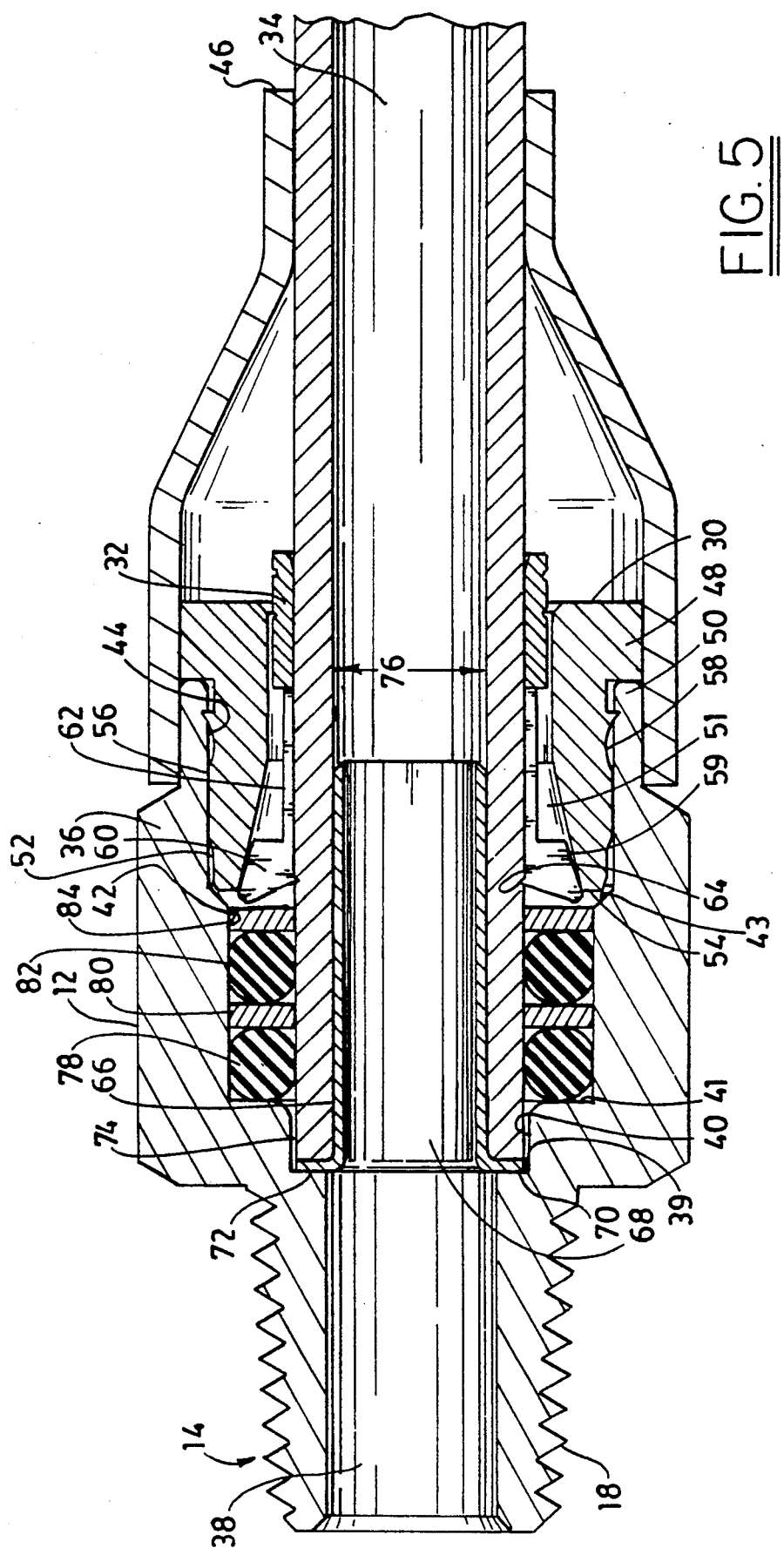
FIG. 5 is a sectional view of the embodiment of FIG. 1.

FIG. 5 is a sectional view of the preferred releasable coupling 10 of FIG. 1. Referring to FIG. 5, it will be seen that a socket 34 formed in a wall 36 of releasable connector body 12 preferably comprises four concentric stepped bores 38, 40, 42, and 44, which can be produced by a single machining operation or in a mold requiring no special release technique. As used in applicants' claims, bore 44 is the "first bore," bore 42 is the "second bore," bore 40 is the "third bore," and bore 38 is the "fourth bore."

Each of the first, second, third, and forth bores is comprised of a step defined by the intersection of two intersecting surfaces. Thus, referring again to FIG. 5, and going from right to left, the first such step, step 43, separates the first bore 44 and the second bore 42, and the second such step, step 41, separates the second bore 42 and the third bore 40, and the third such step 39 separates the third bore 40 and the fourth bore 38.

Within the socket 34 is a means for compressing the flexible arms of a collet upon movement of the collet in a direction away from threaded portion 14. In the embodiment illustrated in FIG. 5, this means is a tapered cam surface reducing towards one end 46 of the connector body 12; this tapered cam surface is designed to be engaged by resilient arms on collet 32 to compress such arms inwardly and to cause them to engage and hold a tube 16 extending into the socket.

Any means for providing a tapered cam surface within socket 34 may be used in releasable coupling 10.

By way of illustration, one may use the encircling insert collar 14 described in U.S. Pat. No. 4,958,858 of Guest, the disclosure of which is hereby incorporated by reference into this specification. This encircling insert collar 14 is inserted within the throughway of the coupling body by ultrasonic welding; it has a tapered cam surface 17 reducing towards the open end of the insert.

By way of further illustration, one may use the molded plastics insert 19 described in U.S. Pat. No. 4,923,220 of Guest, the disclosure of which is hereby incorporated by reference into this specification. This molded plastics insert 19 of this patent is secured around the open end of the coupling body by ultrasonic welding. It has an internal frusto-conical cam surface 20 tapering towards the open end of the body. The collet used in the coupling of this patent contains arms which have enlarged ends 24 the outer faces of which are engagable with the frusto-conical cam surface 20 to press the arms inwardly.

The tapered cam surface may be formed as an integral part of the coupling body. Thus, for example, one may use a coupling body comprised of a bore similar to that used in the coupling described in U.S. Pat. No. 4,573,716 of Guest, the disclosure of which is hereby incorporated by reference into this specification. The bore of the coupling of this patent contains an enlarged diameter portion 15, which is comprised of a tapered portion 18 tapering to a narrow diameter in the axially outward direction, the taper being terminated by an inwardly facing shoulder.

The tapered cam surface may be provided by a collar, such as the collar 2 described in U.S. Pat. No. 3,653,689 of Sapy et al., the disclosure of which is hereby incorporated by reference into this specification. The collar 2 has an interior surface which has a divergent portion 2a. The outer surface of the collar 2 has a cylindrical guide portion 8 for fitting into a socket; a chamfered end portion 9; a second cylindrical portion 10; a third portion 11 which is conical and defines a sharp, tooth-edged projection; and a chamfered rim for setting the collar when it is in position in the socket.

FIG. 5 illustrates one preferred means of providing a tapered cam surface within socket 34. In this preferred embodiment, a press-fit sleeve 30 is used.

Sleeve 30 may be driven into bore 44. Sleeve 30 is provided with a flanged head 48 so that, when head 48 abuts shoulder 50 of connector body 12, the sleeve cannot be pushed any further into the socket.

The sleeve 30 retained in bore 44 has an inner surface 51 inclined to the axis of bore 44. The outer surface of collar 30 has a cylindrical guide surface 52 for fitting into bore 44; a chamfered end portion 54; a second cylindrical portion 56 having a larger diameter than the portion 52 to be force fitted into the bore 44; a third portion 58 which is conical and defines a sharp, tooth-edged projection; and a chamfered rim 48 for setting the collar when it is in position in the bore 44.

Collar 30 may be made out of any suitable material, such as brass, stainless steel, plastic, and the like.

Collar 30 is one of the preferred housings for the slotted collet 32. Because the inside configuration of the collar 30 is beveled to match the outside configuration of the slotted collet 32, when pressure (or vacuum) is introduced into the system, the collet and the tubing 16 move slightly backward, and the slotted collet 32 is compressed and causes the sharp gripping ridges machined into it to bite into the tubing 16's outside diameter. The greater the pressure, the stronger the grip.

Any suitable slotted collet may be used as collet 32. By way of illustration and not limitation, one may use a collet having a plurality of resilient fingers adapted to engage the outer surface of a tube to be located in the coupling body. Thus, the collet 18 of the coupling of U.S. Pat. No. 4,958,858 may be used. This collet contains a annular portion 19 formed with axially extending resilient fingers 20; the resilient fingers terminate in enlarged heads 21 which have projecting metal teeth on the inner surfaces thereof.

One preferred slotted collet is illustrated in FIG. 5. Referring again to FIG. 5, it will be seen that collet 32 has a conical outer face 59 and comprises a multiplicity of flexible jaws 60. The flexible jaws can be closed radially by the combined action of the conical face 59 and the inner inclined surface 51 of the collar 30. Each of the jaws 60 has a portion 62 of reduced cross-section to increase its flexibility, and a circular, sharp-angled, knife edged portion 64 arranged to bite into the periphery of semi-rigid plastic tube 16.

Referring again to FIG. 5, it will be seen that connector body 10 is preferably comprised of a means for supporting the interior surface of a tube such as, e.g., the tube support 66.

One of the functions of tube support 66 is to provide support for the inside diameter of tube 16. Another function of tube support 66 is to maintain the outside diameter of tube 16; it thus tends to minimize the oval tube condition which often is associate with coiling of a tube on a bulk spool. Yet another function of tube support 66 is to prevent collapse of the tube 16, thereby minimizing the potential for fluid leaks.

Tube support 66 is preferably substantially cylindrical.

Tube support 66 may be driven into bore 40; alternatively, when provided with threads which mate with threads in bore 40, it may be screwed into bore 40.

Tube support 66 is comprised of bore 68, and it is provided with a flanged head 70. Step 39 is defined by walls 72 and 74, which intersect at a substantially 90 degree angle with each other; and the flanged head 70 nests within the shoulder formed by the intersection of walls 72 and 74.

In the preferred embodiment illustrated in FIG. 5, the external diameter 76 of tube support 66 is substantially equal to, but is a slight bit smaller than, the internal diameter of tube 16; it is from about 90 to about 99 percent of the internal diameter of tube 16. Thus, as tube 16 is pushed over the walls of tube support 66, it tends to push the tube support up against step 39.

The tube support 66 acts in conjunction with at least three separate, concentric sealing means, at least two of which preferably have substantially the same external diameter. Each of the concentric sealing means is located within stepped bore 42, and is disposed between the connector body 12 and the tube support 66. Thus, referring to FIG. 5, disposed around tube support 66 is annular sealing means 78, washer 80, annular sealing means 82, and washer 84.

Annular, resilient sealing means are well known to those skilled in the art and are described, e.g., on pages 8-138 to 8-142 of Eugene A. Avallone et al.'s "Marks Standard Handbook for Mechanical Engineers," Ninth Edition (McGraw-Hill Book Company, New York, 1986), the disclosure of which is hereby incorporated by reference into this specification.

A preferred annular resilient sealing means is the elastomeric O-rings 78 and/or 82 illustrated in FIG. 5. The term elastomeric, as used in this specification, refers to a macromolecular material which, at room temperature, is capable of recovering substantially in size and shape after removal of a deforming force.

By way of illustration, suitable elastomeric materials include natural rubber and synthetic rubber.

One suitable elastomeric material is styrene-butadiene elastomers, often referred to as "Buna-S," "SBR," and "GR-S." These materials are copolymers of butadiene and styrene. These and other elastomeric materials are described on pages 278-282 of George S. Brady et al.,s "Materials Handbook," Twelfth Edition (McGraw-Hill Book Company, New York, 1986), the disclosure of which is hereby incorporated by reference into this specification.

Other suitable elastomers include neoprene (which is also known as chloroprene), butyl rubbers (also referred to as isobutylene-isoprene elastomers), isoprene, and polyacrylate elastomers.

One preferred class of elastomers is the nitrile elastomers, also known as "NBR rubbers" or "Buna N;" these materials are copolymers of acrylonitrile and butadiene. Many commercial grades include from 20 to 50 percent of acrylonitrile.

Another preferred elastomer is "VITON," a vinylidene fluoride hexafluoropropylene tetrafluoroethylene copolymer sold by E.I. duPont de Nemours and Company of Wilmington, Del. Elastomers of the same type, produced by the Minnesota Mining and Manufacturing Company, are sold under the trade name of "FLUOREL."

The elastomeric material may be an ethylene-propylene elastomer, also known as "EPR rubber." These materials are available as copolymers and terpolymers.

Alternatively, the elastomeric material may be a polybutadiene elastomer, a polysulfide elastomer (also known as "Thiokol"), a urethane elastomer, a chlorosulfonated polyethylene elastomer (commonly known as "Hypalon"), a epichlorohydrielastomer, a fluorocarboelastomer, a phosphonitrile elastomer, a chlorinated polyethylene elastomer, a silicone elastomer, a fluorosilicone elastomer, and the like.

One of the annular, elastomeric sealing means, O-ring 78, abuts against step 41. This sealing means 78 is not contiguous with the other sealing means disposed within bore 42, sealing means 82; the two O-rings are separated from each other by washer 80.

Contiguous with annular, elastomeric sealing means 78 is a means for separating sealing means 78 from annular, elastomeric sealing means 82. Any conventional means may be used for separating the two annular, elastomeric sealing means may be used; one such preferred means is by use of a washer.

As is well known to those skilled in the art, a washer is a small perforated disk, as of metal, rubber, leather, or plastic.

Any of the washers well known to those skilled in the art may be used in the claimed assembly. Thus, e.g., one may use flat washers which may consist of rubber or metal. These and other washers are described in Robert O. Parmley's "Mechanical Components Handbook" (McGraw-Hill Book Company, New York, 1985), the disclosure of which is hereby incorporated by reference into this specification.

The washers used in applicants claimed device preferably consist of a material selected from the group consisting of plastic and brass.

In the preferred embodiment illustrated in FIG. 5, wherein at least four substantially concentric sealing means are disposed between connector body 12 and tube support 66, each of the sealing means is preferably contiguous with at least one other sealing means, but neither O-ring sealing means 78 or 82 is contiguous with another O-ring sealing means.

In the preferred embodiment illustrated in FIG. 5, the annular sealing rings 78 and 82 and the washers 80 and 84 are each concentric and are each disposed within a stepped bore (bore 42) which is intermediate in size between the smallest stepped bore (bore 38) and the largest stepped bore (bore 44).

Figure 5A:
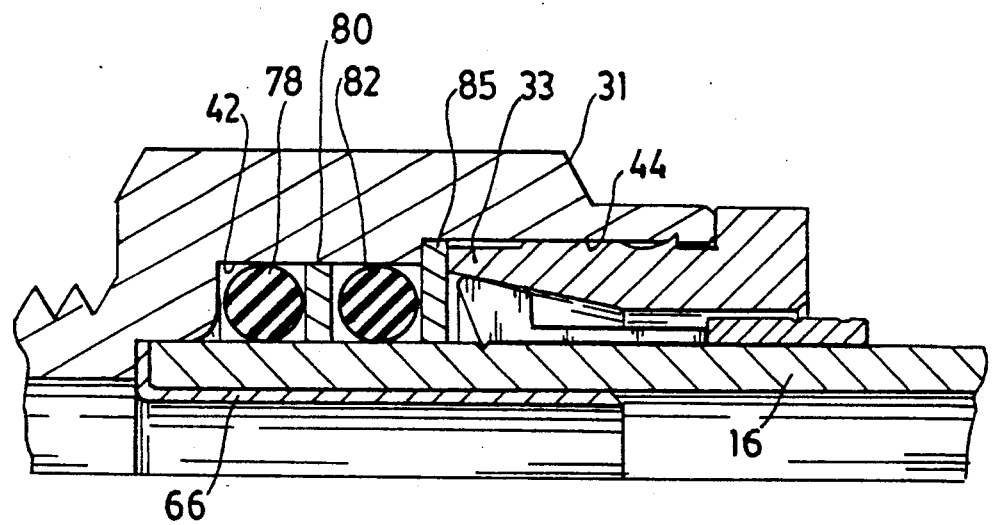
FIGS. 5A and 5B are sectional views of embodiments which are similar to but slightly different from the embodiment of FIG. 1.
Figure 5B:
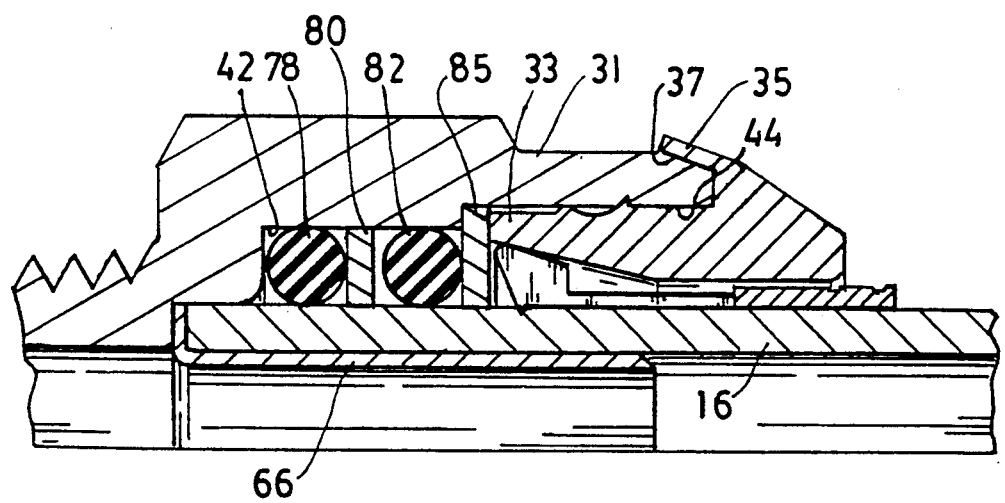

FIGS. 5A and 5B illustrate another preferred embodiment of the invention which, in many respects, is similar to the embodiment described in FIG. 5. Thus, referring to FIG. 5, each of the embodiments of FIGS. 5, 5A, and 5B are comprised of a connector body 12 defining stepped bores 38, 40, 42, and 44, to O-rings (such as O-rings 78 and 82), two washers (such as washers 80 and 84), a sleeve (such as sleeve 30) adapted to fit within the largest of the stepped bores within connector body 12 (such as stepped bore 44), and a tube support 66.

Although the embodiments of FIGS. 5A and 5B also have two washers 80 and 85, these washers are not the same size. Referring to FIGS. 5A and 5B, washer 85 (which is disposed within bore 44) is larger than washer 80 (which is disposed within bore 42). Washer 85 is preferably contiguous with both O-ring 82 and the sleeve, and it nests against the step separating bores 44 and 42. A protruding lip 33 of the sleeve extends preferably extends against and is contiguous with washer 85, thereby maintaining it in contact with the step separating bores 44 and 42.

In the embodiment illustrated in FIG. 5A, the stepped bores are defined within connector body 31, which may consist of metal and/or plastic. The connector body 31 of the embodiment illustrated in FIG. 5B preferably consists essentially of plastic.

FIG. 5B illustrates another preferred embodiment which is similar to the embodiment of FIG. 5A but differs therefrom inasmuch as the sleeve in this embodiment contains an internal body cavity to hold the outside body diameter of the connector body 31. Referring to FIG. 5B, it will be seen that the sleeve is comprised of an internal taper cavity 37 which is comprised of wall 35 and which is adapted to receive a protruding lip of the connector body 31. It is preferred that, in this embodiment, the connector body 31 consist essentially of plastic material. In the preferred embodiment, the connector body 31 cannot expand at its end, and a stronger connection is made between the sleeve and the connector body.

Figure 6:
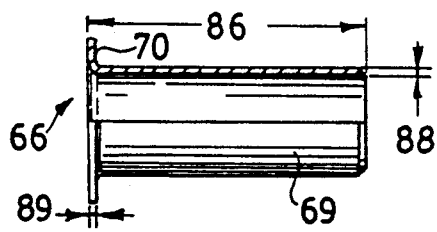
FIG. 6 is a side view of the tube support used in the embodiment of FIG. 1.
Figure 7:
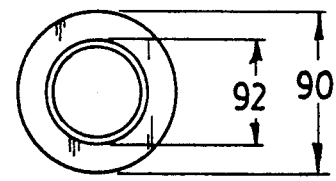
FIG. 7 is an end view of the tube support of FIG. 6.

One preferred means for providing supporting tube 16 is illustrated in FIGS. 6 and 7. The tube support 66 illustrated in FIG. 6 is designed to be non-rigid and floating. Thus, the tube support 16 is allowed to float in the cavity, thereby allowing the tubing to self-align and reducing the connecting force required significantly.

Tube support 66 is preferably movably disposed within the cavity, not being attached to any portion thereof. Thus, in this embodiment, when tube 16 is placed over tube support 66, both are free to move and align with each other.

In another embodiment, not shown, tube support 66 is attached to a surface of the cavity and is not free to float therein.

One of the functions of this preferred tube support is to reinforce the grip of the slotted collet 32 upon the outside diameter of the tube 16.

In the preferred embodiment illustrated in FIG. 6, tube support 66 is comprised of flange 70 and tube support body 69. This tube support 66 has a length 86 of about 0.65 inches, a tube support wall thickness 88 of about 0.016 inches, a flange wall thickness 89 of about 0.016 inches, a flange outside diameter 90 of about 0.375 inches, and a tube support outside diameter 92 of about 0.24 inches. This preferred tube support 66 is preferably comprised essentially of brass.

Figure 8:
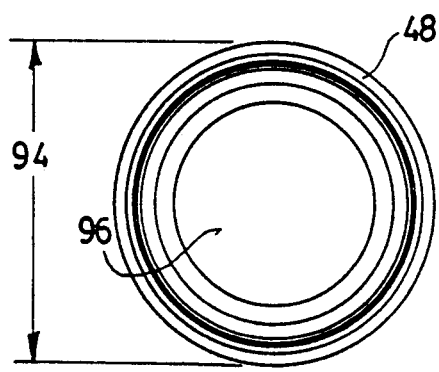
FIG. 8 is an end view of the sleeve used in the embodiment of FIG. 1.
Figure 9:
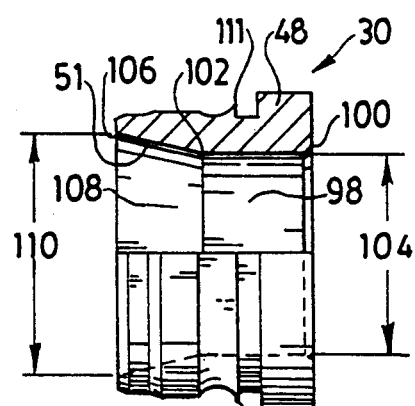
FIG. 9 is a side view of the sleeve used in the embodiment of FIG. 1.

FIGS. 8 and 9 illustrate a preferred means for causing the arms of collet 32 to bite into the walls of tube 16. Sleeve 30, the housing for collet 32, has an inside configuration which is beveled to match the outside configuration of the slotted collet 32. When pressure (or vacuum) is introduced into the system, the collet and tubing move slightly backwards; the slotted collet is compressed and causes its sharp, gripping ridges machined into it to bite into the outside diameter of the tube 16.

The preferred press fit sleeve 30 is comprised of a flanged head 48 which provides a positive stop for the sleeve 30 at the step 43 of connector body 12 (see FIG. 5).

Press fit sleeve 30 also is comprised of internal taper 51 which is adapted to mate with the inclined, conical face 59 of collet 32 (see FIG. 5) and, when the collet is moved backwards, to cause the collet bite edges 64 to contact the outside surfaces of tubing 16. In one preferred embodiment, illustrated in Figure, the internal taper 51 forms an angle of about 13 degrees.

In the preferred embodiment of collar 30, which is illustrated in FIGS. 8 and 9, the external diameter 94 of flanged head 48 is about 0.75 inches.

Collar 30 is comprised of a bore 96, with at least two sections of different diameter. Referring to FIG. 9, section 98, which extends from about point 100 to about point 102, has an inner diameter 104 of about 0.464 inches. The section from point 102 to point 106, section 108, has a inner diameter which increases from 0.464 inches (at point 104) to an inner diameter 110 of 0.568 inches at point 106.

In one embodiment, not shown, an identifying legend is printed across shoulder 48. Thus, for example, one may print in letters at least 1/16" high a legend such as, e.g., "L-DOT-A-3/80D."

Referring again to FIGS. 5 and 9, knife edge surfaces 111 and 112 tend to bite into the inner surface of stepped bore 44. These knife edge surfaces 111 and 112, in conjunction with shoulder 48, tend to keep sleeve 30 positioned in substantially one place within stepped bore 44.

The collar 30 illustrated in FIGS. 5 and 9 is one designed to press fit within bore 44. In another embodiment, not shown, a collar 30 is designed to screw into bore 44, which is provided with suitable threads to receive it.

Figures 10, 11:
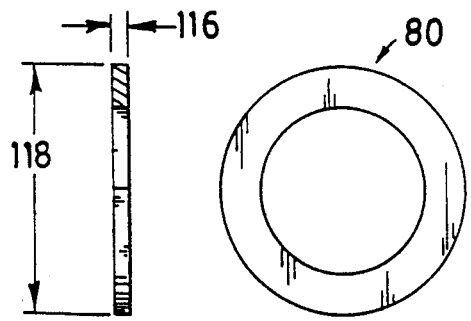
FIG. 10 is a side view of the washer used in the embodiment of FIG. 1.
FIG. 11 is an end view of the washer used in the embodiment of FIG. 1.

A preferred embodiment of washer 80 is illustrated in FIGS. 10 and 11. A similar, identical, or different washer may be used as washer 84.

Referring to FIGS. 10 and 11, it will be seen that the preferred washer 80 has a thickness 116 of about 0.34 inches, an outside diameter 118 of about 0.574 inches, and an inner diameter 120 of about 0.394 inches. This washer, when placed between O-rings 78 and 82, helps create a proper O-ring gland (the cavity into which the O-ring is installed) and maximize the sealing capability of the assembly.

Figures 12, 13:
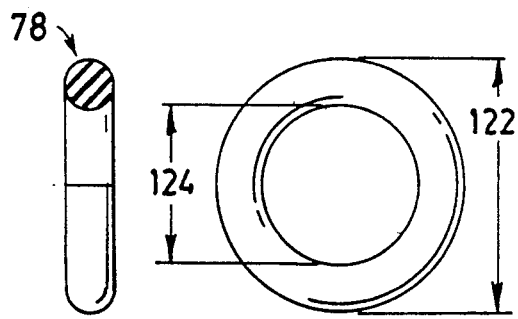
FIG. 12 is a side sectional view of the O-ring used in the embodiment of FIG. 1.
FIG. 13 is an end view of the O-ring used in the embodiment of FIG. 1.

FIGS. 12 and 13 illustrate a preferred embodiment of annular sealing means 78. A similar, identical, or different embodiment may be used for annular sealing means 82.

Referring to FIGS. 12 and 13, it will be seen that the preferred O-ring 78 has an outside diameter 122 of 0.574 inches and an insider diameter 124 of 0.394 inches. Thus, in addition to being concentric, both of the washers 80 and 84 and the O-rings 78 and 82 preferably have the same internal and external diameters.

Figure 15:
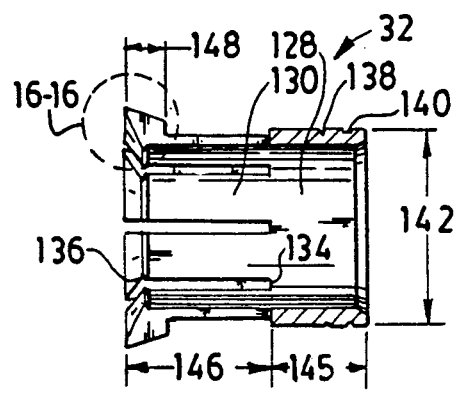
FIG. 15 is a side view of the collet used in the embodiment of FIG. 1.

FIG. 15 is a cross-sectional view of the preferred collet 32 used in the coupling of this invention. Collet 32 preferably serves at least about three functions. Its main function is to grip tubing 16. Another function is to guide tubing 16 as it is being inserted into the bore of the connector body 12 and over the tube support 66. Yet another function is to release tubing 16 when force is applied to it in the proper direction(s).

Collet 32 may be made from metallic material, such as brass or stainless steel. Alternatively, or additionally, it may be made from molded plastic.

In one embodiment, not shown, the collet 32 is made from both metal and plastic.

By way of illustration and not limitation, the collet 3 of U.S. Pat. No. 3,653,689 of Sapy et al. is covered with a layer of metal 26 (such as chromium) having a sufficient strength to compensate for the softness of the plastic material and to enable the teeth defined by lips 3c/3c' to bite into the plastic tube 4. This collet may be used in the device of the instant invention.

By way of further illustration, the clamping member 27 of U.S. Pat. No. 3,653,689 of Sapy et al. is made of plastic material that is reinforced internally by spring-steel strips 28a and 28b; each of these strips have inclined portions (29 and 30, respectively) defining lips by which the member 27 is attached to plastic tube 4. The collet of the Sapy et al. patent may be used in the coupling of this invention.

Figures 14, 16:
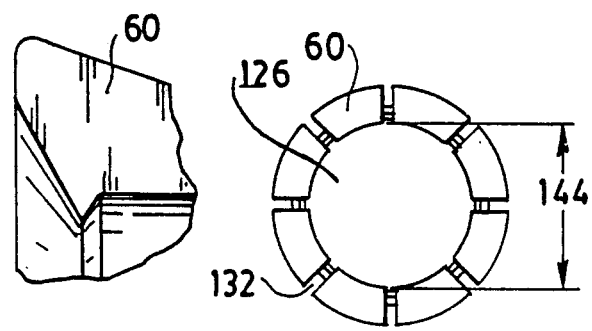
FIG. 14 is an end view of the collet used in the embodiment of FIG. 1.
FIG. 16 is a partial, exploded side view of the collet used in the embodiment of FIG. 1, taken along lines 16—16 of FIG. 15.

FIGS. 14, 15, and 16 illustrate one of the preferred embodiments of collet 32 used in the coupling 10. This collet 32 preferably consists essentially of a metallic material (such as brass, or stainless steel) and, preferably, is an integral, annular assembly.

Collet 32 is comprised of a bore 126, a substantially solid shell section 128, and, joined to section 128, a slotted shell section 130.

Referring to FIG. 14, a multiplicity of slots 132 are formed in section 130 of collet 32. These slots, which extend from about point 134 to about 136 on the body of collet 32, define a multiplicity of flexible jaws 60; in one preferred embodiment, they are each about 0.025 inches thick.

It is preferred that collet 32 contain at least two flexible jaws 60 and, more preferably, at least four flexible jaws 60. It is even more preferred that collet 32 contain at least about 6 flexible jaws 60. In the preferred embodiment illustrated in FIG. 14, collet 32 contains at least 8 flexible jaws 60.

In the preferred embodiment illustrated in FIG. 15, collet 32 is comprised of annular grooves 138 and 140. The function of groove 138 is to identify that the collet is for use with fractional inch tubing; when the collet is to be used with metric tubing, no such groove 138 is used. The function of groove 140 is to provide a means for attaching a manual release button (not shown in FIG. 15) to the collet.

Figure 51:
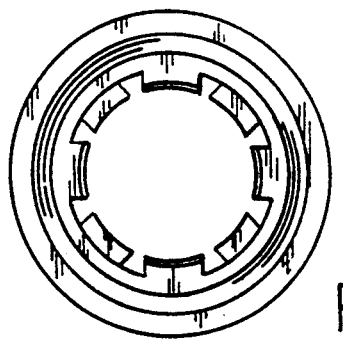
FIGS. 51 through 53 illustrate another means of disconnecting a flexible tubing from the coupling of this invention.
Figure 52:
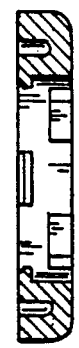

FIGS. 51 and 52 each illustrate such a manual release button.

In the preferred embodiment illustrated in FIGS. 14, 15, and 16, the external diameter 142 of the collet 32 is 0.459 inches, the internal diameter 144 of collet 32 is 0.382 inches, the distance between the edges of jaws 60 is about 0.50 inches, the length 145 of solid sleeve section 128 is about 0.223 inches, the length of 146 of the slotted jaw section is about 0.339 inches, and the width 148 of jaws 60 is about 0.102 inches.

Figure 17:
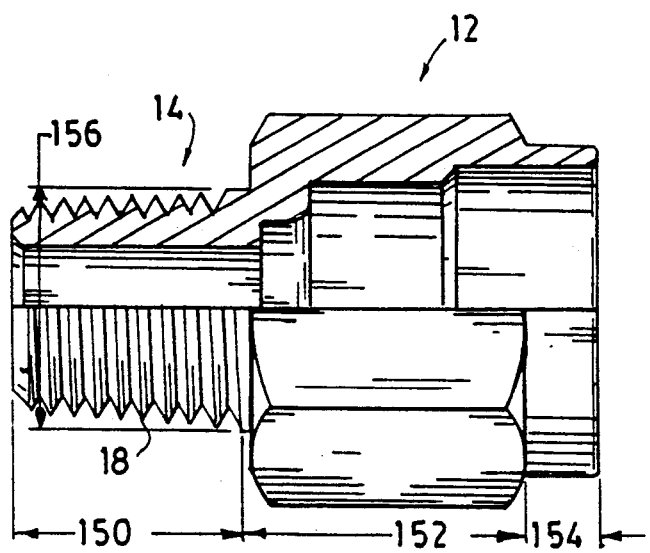
FIG. 17 is a side view of the connector body of the embodiment of FIG. 1.
Figure 18:
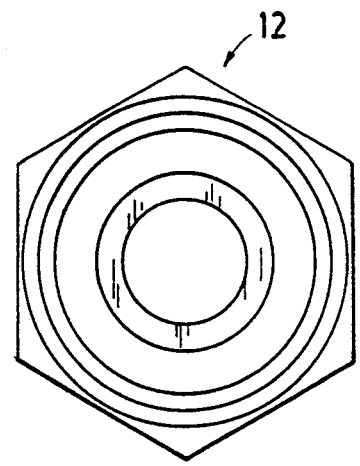
FIG. 18 is an end view of the connector body of the embodiment of FIG. 1.

The preferred connector body 12 in which the collet 32, the collar 30, the O-rings 78 and 82, and the washers 80 and 84 are disposed, is illustrated in FIGS. 17 and 18.

Referring to FIGS. 17 and 18, it will be seen that the length 150 of the threaded portion 14 of connector body 12 is about 0.551 inches, the length 152 of the intermediate portion of connector body 12 is about 0.632 inches, the length 154 of the end portion of the connector body 12 is 0.164 inches, and the outside diameter 156 of threaded portion 14 is 0.25 inches.

Figure 19:
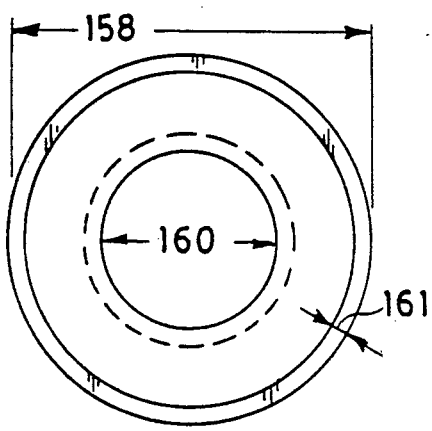
FIG. 19 is an end view of the protective cap of the embodiment of FIG. 1.
Figure 20:
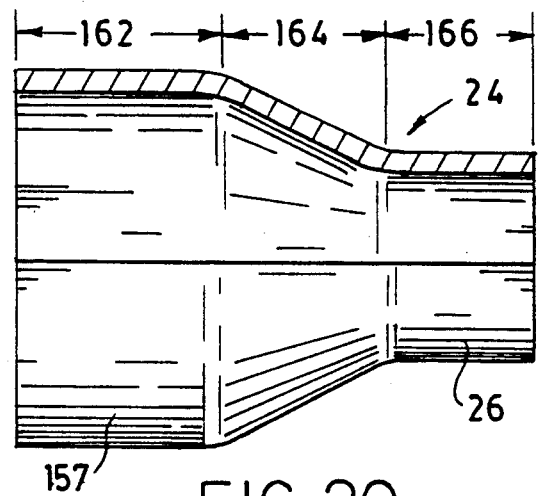
FIG. 20 is a side view of the protective cap of the embodiment of FIG. 1.
Figure 21:
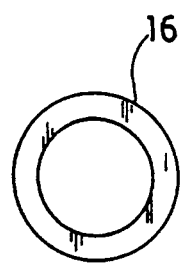
FIG. 21 is an end view of a flexible tube which may be used in the coupling depicted in FIG. 1.
Figure 22:
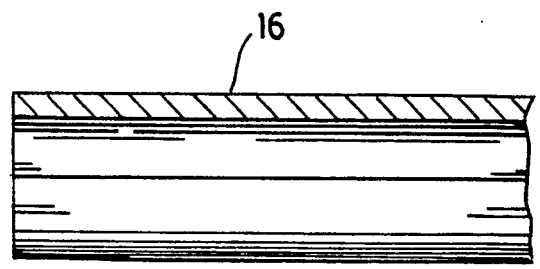
FIG. 22 is a side view of the flexible tubing of FIG. 21.

A preferred embodiment of protective cap 24 is illustrated in FIGS. 19 and 20. The use of removable cap 24 provides protection of the internal components of the connector from environmental pollutants, such as dirt and other particles. It also protects against accidental disconnection of tubing 16, requiring the removal of the cap 24 before tubing 16 may be disconnected.

In one embodiment, the protective cover is preferably made of flexible molded plastic. In another embodiment, the protective cover 24 consists essentially of elastomeric material. Thus, by way of illustration, the protective cap 24 may consist of "SANTOPRENE 101-87," a thermoplastic elastomeric material sold by the Monsanto Chemical Company.

Referring to FIGS. 19 and 20, the preferred protective cap 24 is comprised of a wide portion 157 and a narrow portion 26. The internal diameter 158 of wide portion 157 is about 0.725 inches. The internal diameter 160 of the narrow portion 26 is about 0.367 inches. The thickness 161 of the wall of the preferred, integral cap is about 0.050 inches. The length 162 of the wide end section of the cover 24 is about 0.452 inches, the length 164 of the intermediate section of the cover 24 is about 0.376 inches. The length 166 of the narrow end section of the cover 24 is about 0.27 inches.

Figure 23:
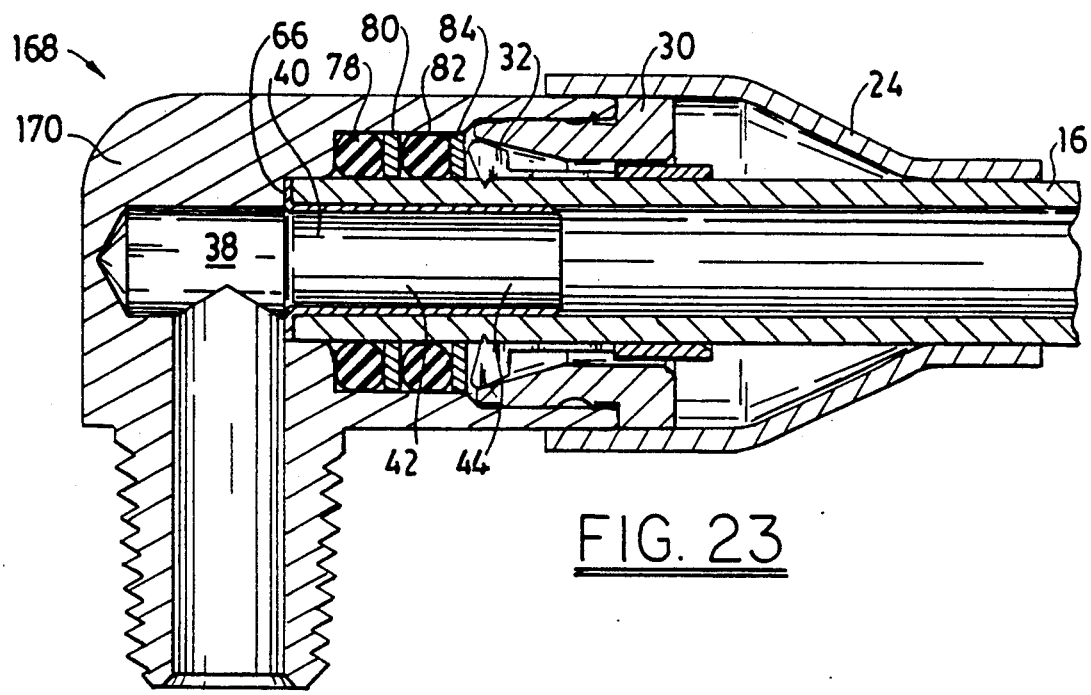
FIG. 23 is a side sectional view of a machined elbow body which contains a structure for making a quick connection with a flexible tube.

FIG. 23 illustrates another preferred embodiment of the invention, a machined fitting comprised of preferred collar 30, collet 32, O-rings 78 and 82, washers 80 and 84, and a multiplicity of stepped bores.

Referring to FIG. 23, a machined elbow assembly 168 is illustrated in order to demonstrate that the principles of the instant invention can be incorporated into many different shaped bodies as long as they contain a multiplicity of stepped bores, and as long as the collar 30/collet 32/O-rings 78/82/and washers 80/84 are installed in them in the appropriate manner.

Referring again to FIG. 23, stepped bores 38, 40, 42, and 44 may be machined into the elbow assembly body 170. Thereafter, tube support 66 may be press-fit against step 39. Thereafter, O-rings 78 and 82 and washers 80 and 84 may be installed within stepped bore 42. Thereafter, press-fit sleeve 30 may then be press-fit within stepped bore 44. Thereafter, the collet 32 may be inserted within stepped bore 44 until it is substantially contiguous with washer 84. Thereafter, tubing 16 may be inserted until it fits over the walls of tube support 66.

It will be apparent that the claimed system can be used in bodies of other shapes, as long as they contain a multiplicity of stepped bores. Some of these other shaped bodies are shown in FIGS. 24 through 45.

FIGS. 24 through 40 illustrate various forged fittings which contain the claimed system.

The preparation of fittings by forgings is well known to those skilled in the art. As is well known to those in the art, forging is the plastic deformation of metals, usually at elevated temperatures, into desired shapes by compressive forces exerted through a die. See, e.g., J. E. Jenso(ed.) "Forging Industry Handbook," 1966, the disclosure of which is hereby incorporated by reference into this specification.

Each of the following fittings contains at the coupling system described for the coupling of FIG. 1.

Figure 24:
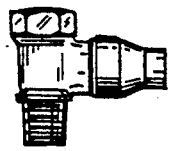
FIGS. 24 through 34 illustrate various forged bodies, each of which contains at least one structure for making a quick connection with a flexible tube.

Thus, e.g., FIG. 24 illustrates a male elbow tube connected to a male NPT. In this forging configuration, the tube 16 enters at a 90 degree angle, requiring a 90 degree elbow for connection.

Figure 25:
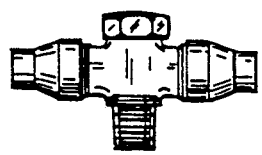

Thus, e.g., FIG. 25 illustrates a male branch tee tube connected to a tube which, in turn, is connected to a male fitting. This configuration is suitable for tube connections that need branching from one point of connection to another.

Figure 26:
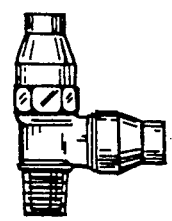

Thus, e.g., FIG. 26 illustrates a male run tee tube connected to a tube which, in turn, is connected to a male NPT fitting. This configuration is suitable for tube connections that require running to another point 90 degrees from the first connection point.

Figure 27:

Thus, e.g., FIG. 27 illustrates a male 45 degree tube connected to a male NPT fitting. In many instances, with the use of this configuration, the tube is more easily connected at a 45 degree angle.

Figure 28:
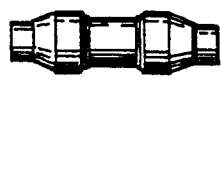

Thus, e.g., FIG. 28 illustrates a union tube with another tube. This configuration is suitable with tube run splices requiring an in-line union.

Figure 29:
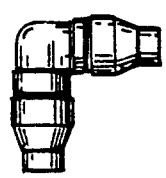

Thus, e.g., FIG. 29 illustrates a union elbow tube connected to a tube. This configuration may be used with tube run splices at a 90 degree angle.

Figure 30:
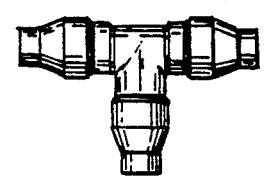

Thus, e.g., FIG. 30 illustrates a tee tube connected to a tube which, in turn, is connected to another tube. This configuration may be used with tube runs that can be teed from an in-line splice.

Figure 31:
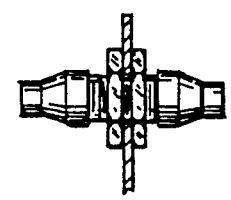

Thus, e.g., FIG. 31 31 illustrates a bulkhead union made by connecting a tube to a tube. This configuration may be used with tube runs needing to be joined through a bulkhead or a wall.

As will be apparent to those skilled in the art, in a fitting system there are many possible forging configurations.

Figure 32:
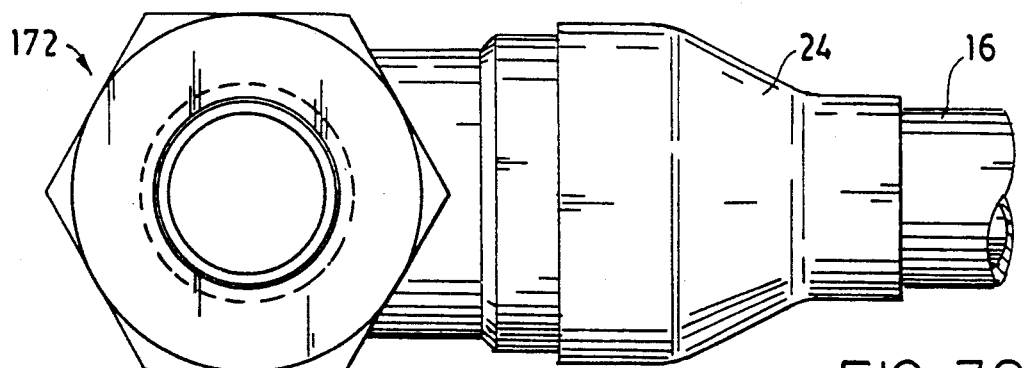
Figure 33:
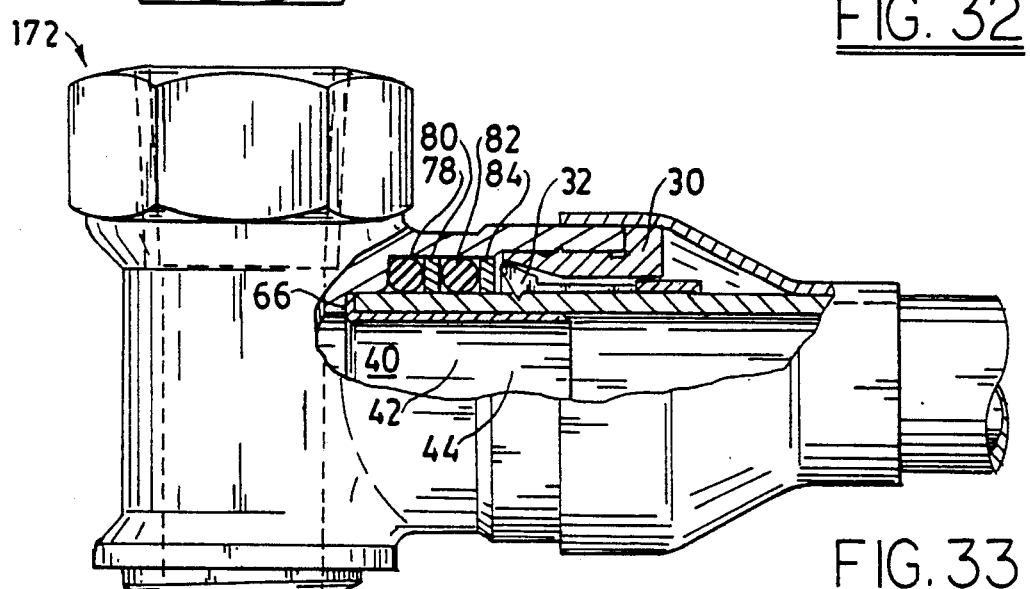
Figure 33A:
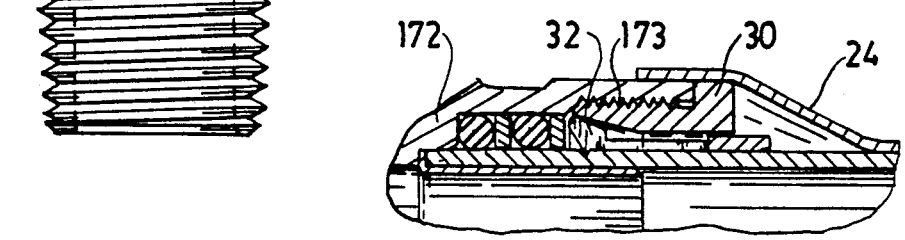
Figure 34:
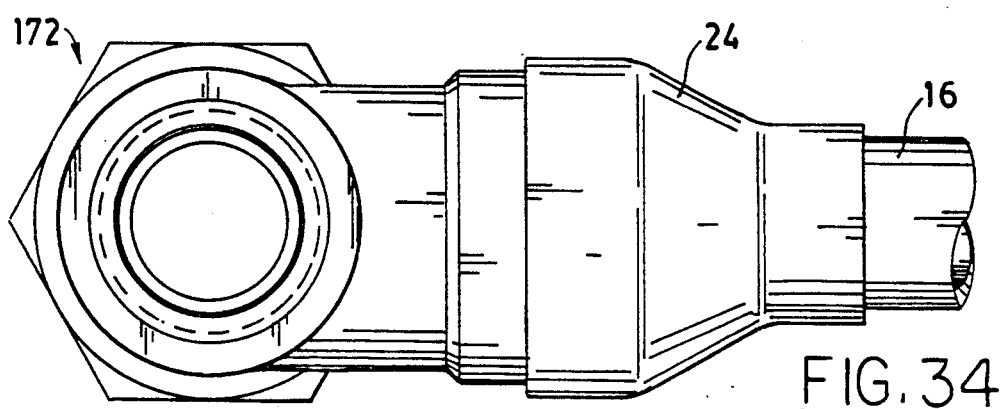

FIGS. 32, 33, 33A, and 34 illustrate a forged connector body 172 in which a male female elbow is connected to a male NPT fitting. FIG. 32 is a top view of the body of FIG. 33, and FIG. 34 is a bottom view of the body of FIG. 33.

Referring to FIG. 33, it will be seen that stepped bores 40, 42, and 44 have been formed in body 172 by conventional forging techniques; and tube support 66, press-fit sleeve 30, collet 32, O-rings 78 and 82, and washers 80 and 84 have been pressed into place in the appropriate stepped bore(s). Thus, as is known to those skilled in the art, the cavities (stepped bores) may be formed by machining in metals, for both forged and extruded bodies.

In another embodiment, the fitting consists essentially of a plastic material, and the cavities therein may be molded and/or formed by other conventional plastic-forming techniques.

The forged bodies of applicants, invention provide several advantages. There are substantially lighter than extruded bodies. Because an external hex can be forged onto the elbow of the male branch and the male run tee, a user my screw the body into the component using a ratchet type wrench. Closer porting is possible because the ratchet tools take less space to operate.

FIG. 33A illustrates a preferred embodiment in which there is a threaded joint 173 between body 172 and sleeve 30, and sleeve 30 is screwed into place within the device prior to the time the collet 32 is press-fit into place. Because sleeve 30 is screwed into the body, one may readily remove sleeve 30 to gain access to the O-ring seals for repair and/or replacement.

FIGS. 35, 36, 37, 38, 39, and 40 illustrate various stackable networks which can be produced using forged fittings, each of which contains the device of the instant invention.

Various aspects of another embodiment of the invention, a coupling made from a cartridge and a connector body, are illustrated in FIGS. 41, 46, 46A, 47, 48, and 48A.

Referring to FIG. 41, coupling 174 is comprised of formed body 176 and cartridge 178.

Figure 42:
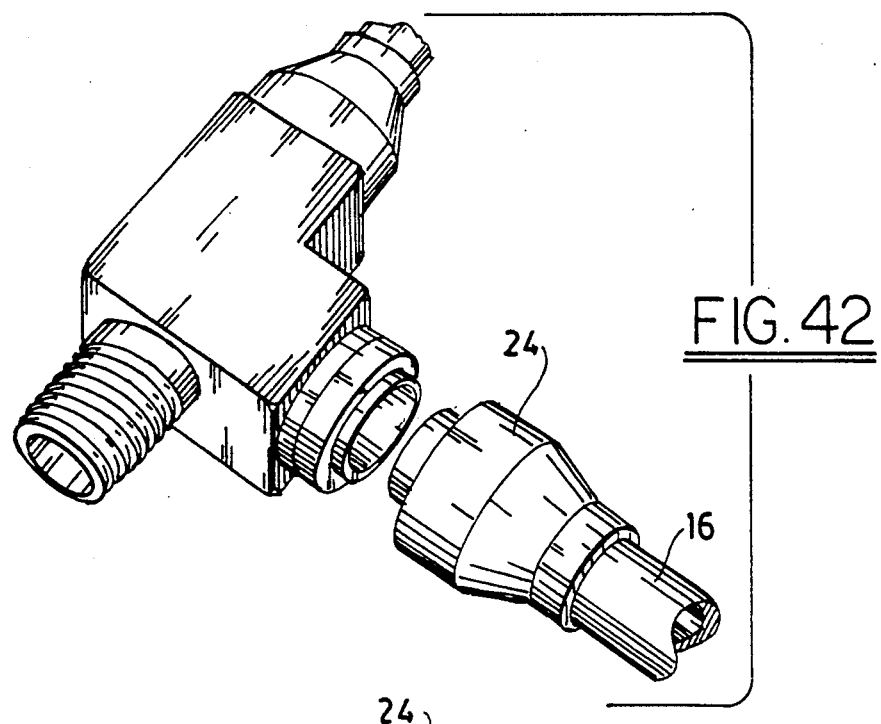
FIGS. 42 through 45 illustrate various extruded fittings, each of which contains at least one structure for making a quick connection with a flexible tubing.
Figure 43:
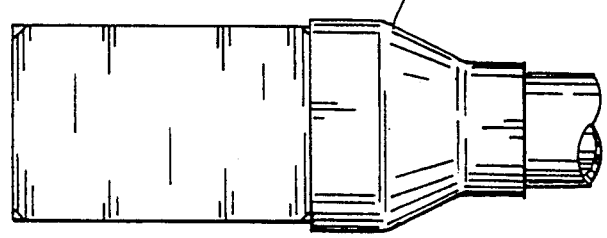
Figure 44:
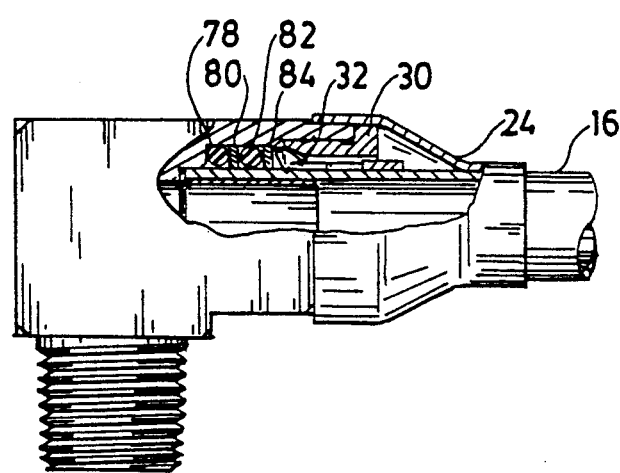
Figure 45:
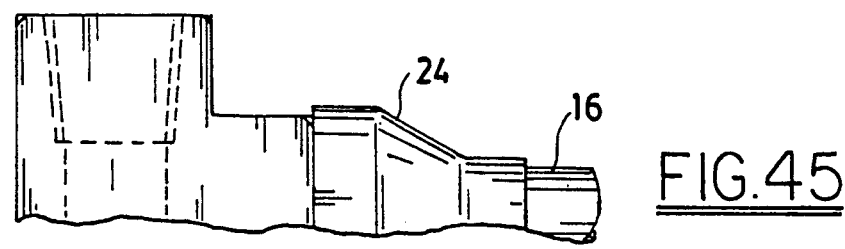

FIGS. 42, 43, and 44 illustrate extruded bodies comprised of the coupling device of this invention. The extruded body is preferably metallic. As is known to those skilled in the art, an extrusion is a uniform metal shape, long in relation to its cross-sectional dimension, produced by forcing a suitably preheated billet or preform through a orifice (such as a die) of the desired cross-section. Some of the advantages of the extruded devices include compact body design, low profile, and maximum allowable wrench flat area on the bodies.

Figure 46:
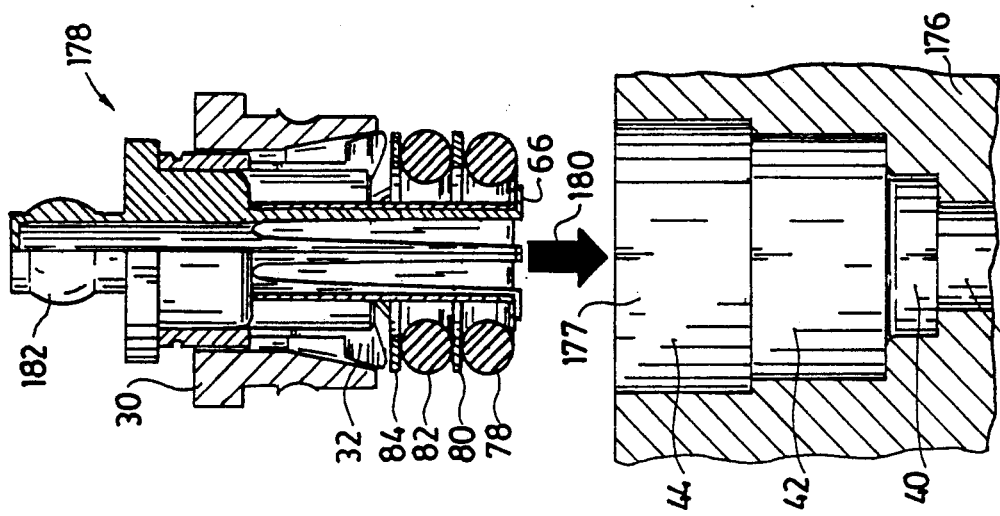

FIG. 46 illustrates how coupling 174 may be produced. Referring to FIG. 46, a cartridge cavity 177 may be prepared by machining (or otherwise forming) a body 176 so that it contains stepped bores 38, 40, 42, and 44.

In the embodiment of FIG. 46, cartridge 178 is inserted into the cartridge cavity 177 in the direction of arrow 180. The cartridge cavity is comprised of an assembly pin, such as assembly pin 182.

Figure 48:
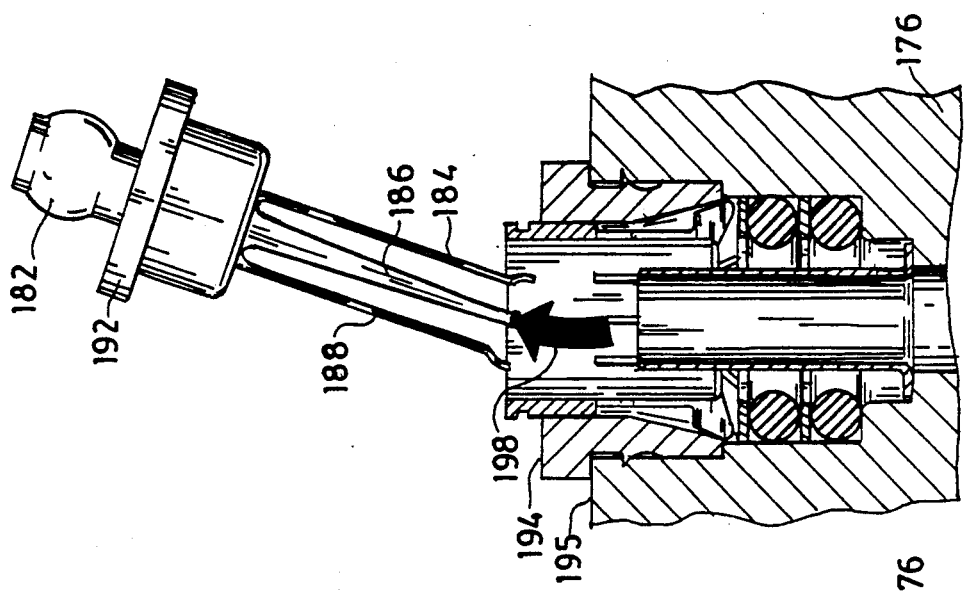
FIGS. 46 through 48 illustrate a process for preparing a releasable coupling for an air-carrying tube in which a cartridge is press-fit into a body comprised of a multiplicity of stepped bores.

Referring to FIG. 48, it will be seen that assembly pin 182 is comprised of a multiplicity of resilient lugs 184, 186, and 188 which, prior to the time the cartridge 178 is inserted within cartridge cavity 177, maintains concentric sleeve 30, collet 32, tube support 66, O-rings 78 and 82, and washers 80 and 84 in a fixed spatial relationship with regard to each other.

Once the cartridge 178 has been inserted into cartridge cavity 177, it may be firmly seated therein by the use of a press-in tool.

Figure 47:
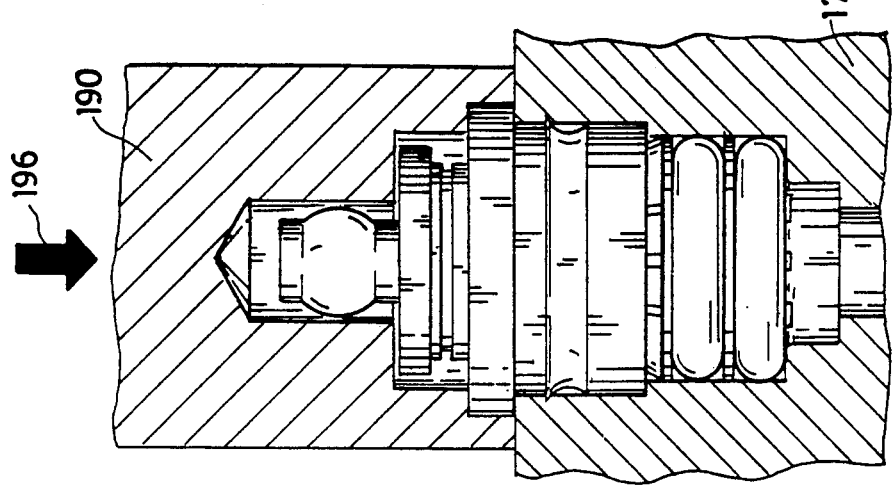

A preferred press in tool, tool 190, is illustrated in FIG. 47. Press-in tool 190 has interior surfaces which are adapted to mesh with the exterior surfaces 192 of the assembly pi(see FIG. 48) and 194 and 195 of the body 176. Press-in tool 190 may be pushed in the direction of arrow 196 to firmly seat the cartridge 178 within cartridge cavity 177.

Once the cartridge 178 has been firmly seated within the cartridge cavity 177, the assembly pin 182 may be removed from the coupling 174 by pulling the pin in the direction of arrow 198.

Another preferred embodiment is illustrated in FIG. 46A and 48A. This embodiment differs from the embodiment of FIGS. 41, in that, in the former embodiment, bore 44 is provided with interior threads 200, sleeve 30 is provided with exterior threads 202, threads 200 and threads 202 are designed to fit into each other, and thus cartridge 178 can be screwed into cartridge cavity 177 rather than being inserted by a press fit.

Figure 49:
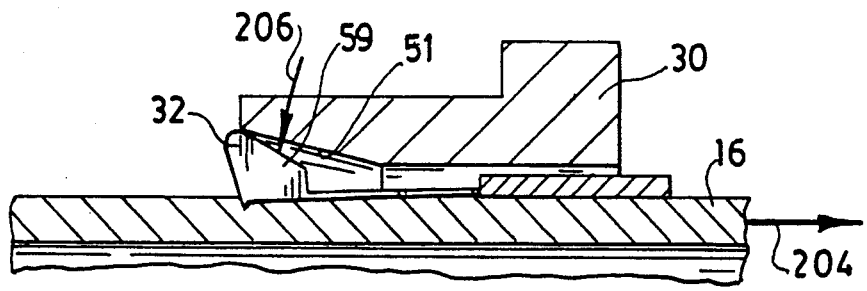
FIGS. 49 and 50 illustrate one means of disconnecting a flexible tubing from the coupling of this invention.
Figure 50:
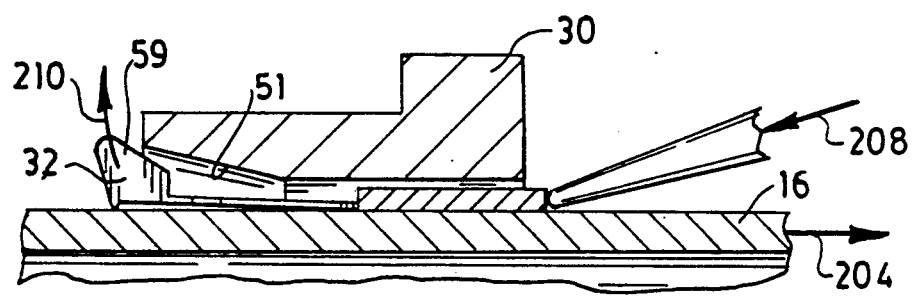

FIGS. 49 and 50 illustrate one preferred means for removing tube 16 from coupling 10.

Referring to FIG. 49, it will be seen that, once tube 16 is gripped by the coupling, attempting to pull it out of the coupling by exerting force on it in the direction of arrow 204 tends to cause collet 32 to grip the tube 16 tighter. Forcing inclined surface 59 of the collet 32 inwardly against the inclined surface 51 of collar 30 causes pressure on the collet 32 to be exerted in the direction of arrow 206.

Thus, it will be seen that applicants' coupling is releasable, that is, the tube 16 may be released from the coupling without disassembly the coupling.

Referring to FIG. 50, it will be seen that tube 16 can be disconnected from the coupling when force is exerted on tube 16 in the direction of arrow 204 if, in addition, force is also exerted on collet 32 in the direction of arrow 208. Because these two forces are exerted in opposite directions, inclined face 51 of collar 30 is pushed away from inclined surface 59 of collet 32, and the collet 32 is thus allowed to move in the direction of arrow 210.

Figure 53:
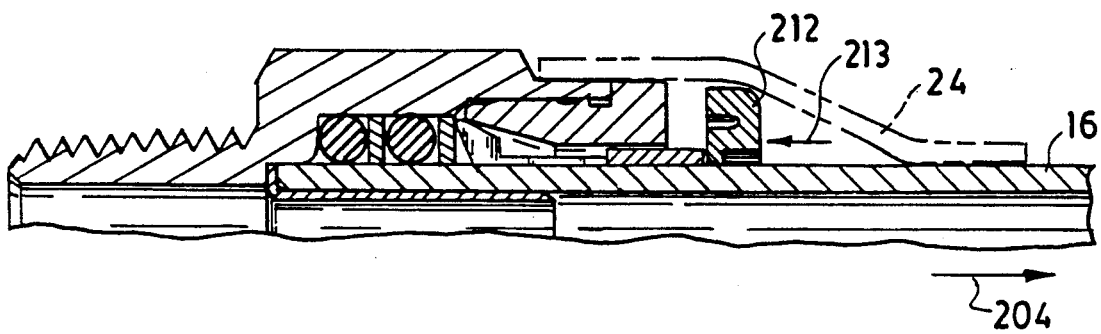

FIGS. 51, 52, and 53 illustrate a preferred embodiment in which the collet 32 is equipped with a manual release button 212. This function of this manual release button, which may be made of molded plastic (such as polypropylene), and which may be removably attached to collet 32, is to enable a user to readily remove flexible tubing 16 from the collet. To remove tube 16 from the coupling, cap 24 may be removed, force may be applied to the manual release button in the direction of arrow 213, and force may simultaneously be applied to tube 16 in the direction of arrow 204, thereby removing the tube 16 from the assembly.

Figure 54:
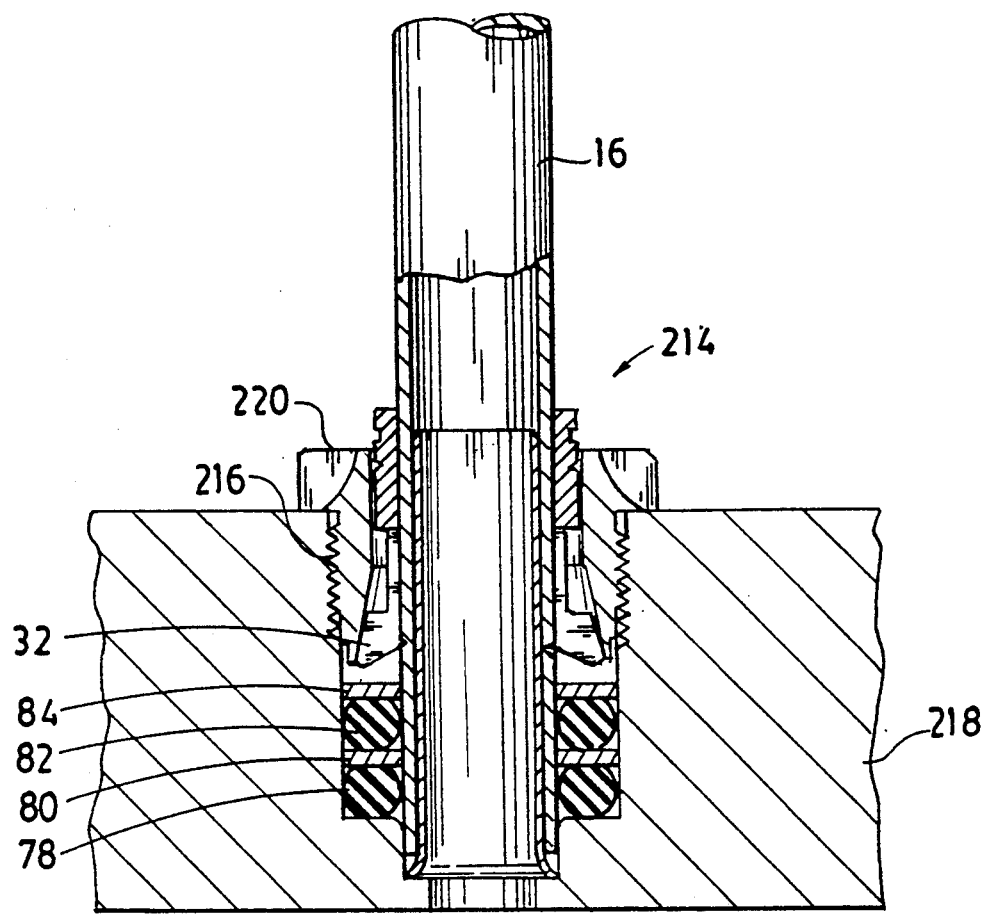
FIG. 54 is a sectional view of an embodiment of the screw-in cartridge of this invention.
Figure 55:
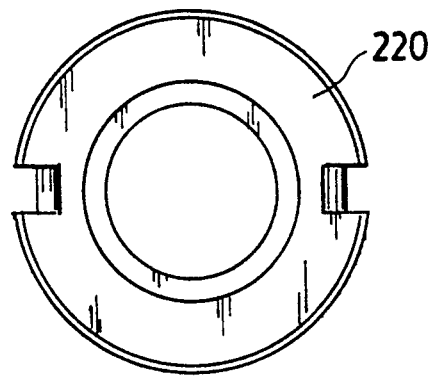
FIG. 55 is a top view of the screw-in sleeve which is a component of the cartridge of FIG. 54.

FIG. 54 illustrates a removable cartridge 214 comprised of a threaded sleeve 216 adapted to screw into body 218. The top 220 of the sleeve 216 has a slotted design (see FIG. 55), allowing one, with the use of a special tool (not shown), to install and/or remove this cartridge 214 into a body. Because, in the preferred embodiment, top 220 is cylindrical, the space between adjacent cartridges 214 may be minimized.

Figure 56:
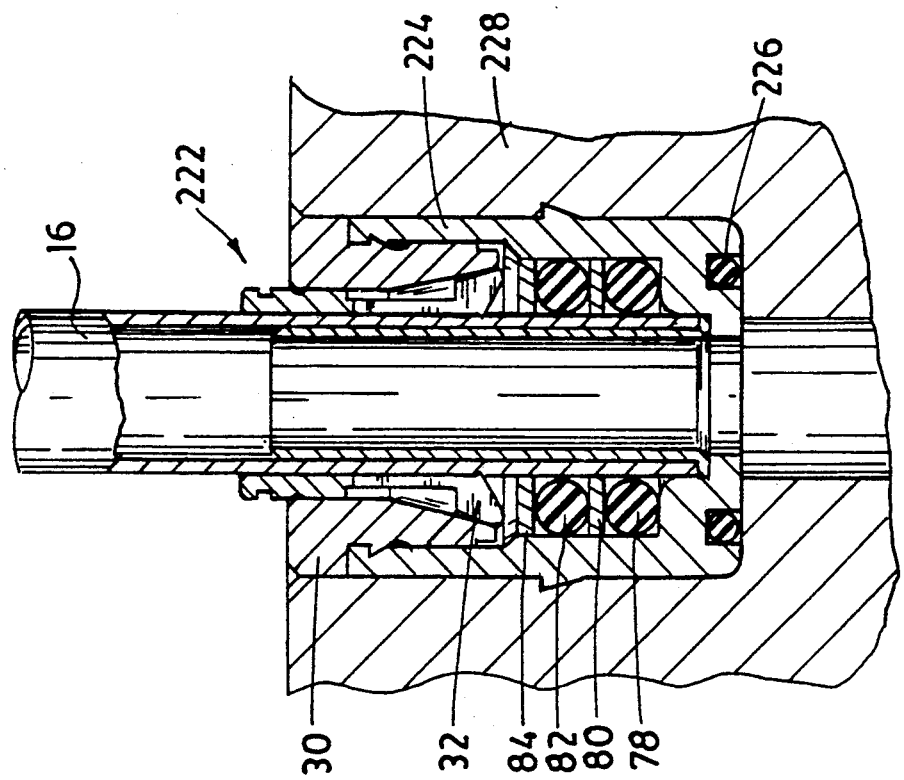
FIG. 56 is a sectional view of a one-piece press-fit cartridge of this invention.

FIG. 56 illustrates a one-piece, non-removable cartridge 222 comprised of the fitting of this invention disposed within body 224, which, in turn, is adapted to fit within body 225. In this embodiment, O-ring 226 prevents leakage.

Figure 57:
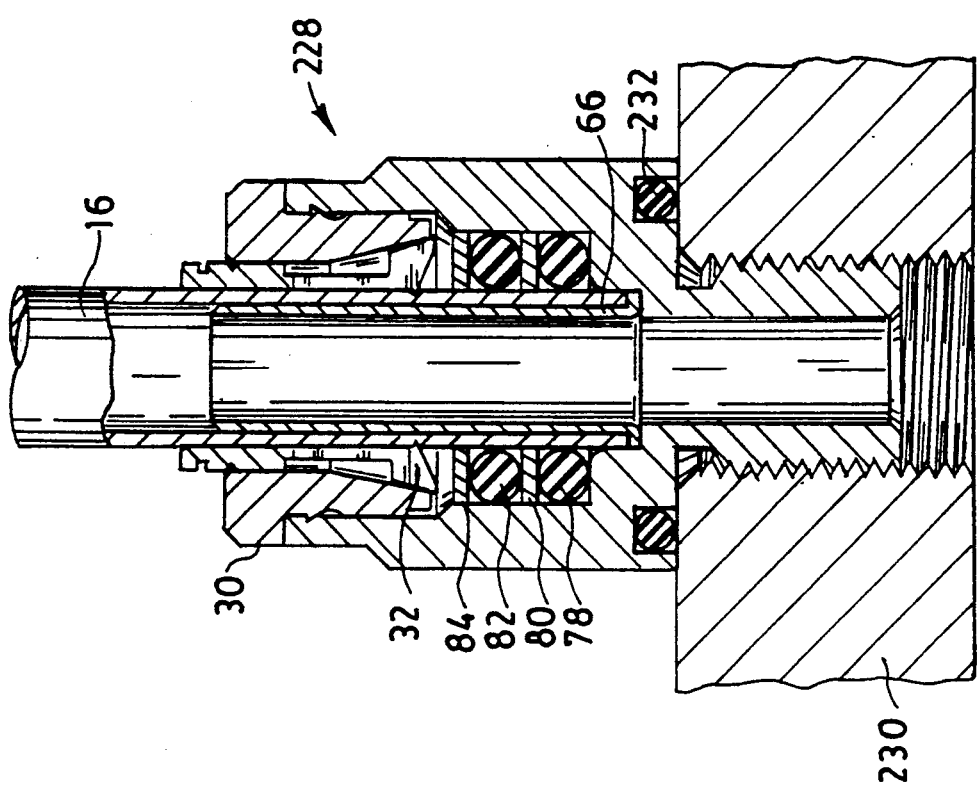
FIG. 57 is a sectional view of a one-piece fitting with straight threads and an O-ring face seal.

FIG. 57 illustrates a one-piece fitting body 228 comprised of the system of this invention which is adapted to be screwed into a body 230 comprised of straight threads (not shown). In this embodiment, a face seal between the mating surfaces of elements 228 and 230 is provided by O-ring 232.

Figure 58:
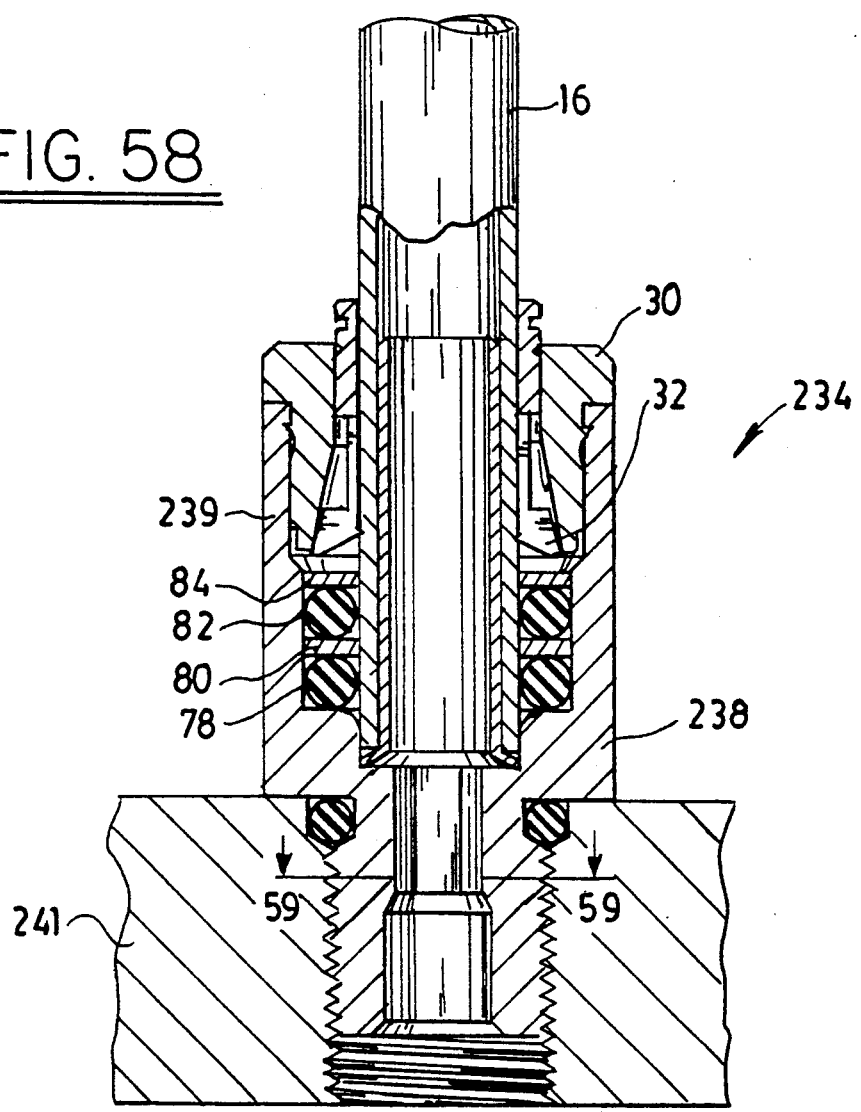
FIG. 58 is a sectional view of an embodiment similar to that of FIG. 57.

FIG. 58 illustrates another fitting body 234 comprised of an internal hex 236, allowing installation with a hex tool. O-ring 238 is connected to fitting body 239 and is disposed between the bottom of body 239 and the cavity of body 241 to provide sealing.

Figure 59:
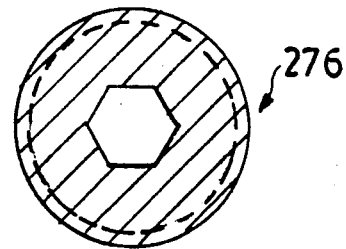
FIG. 59 is a bottom view of the fitting body of FIG. 58.
Figure 60:
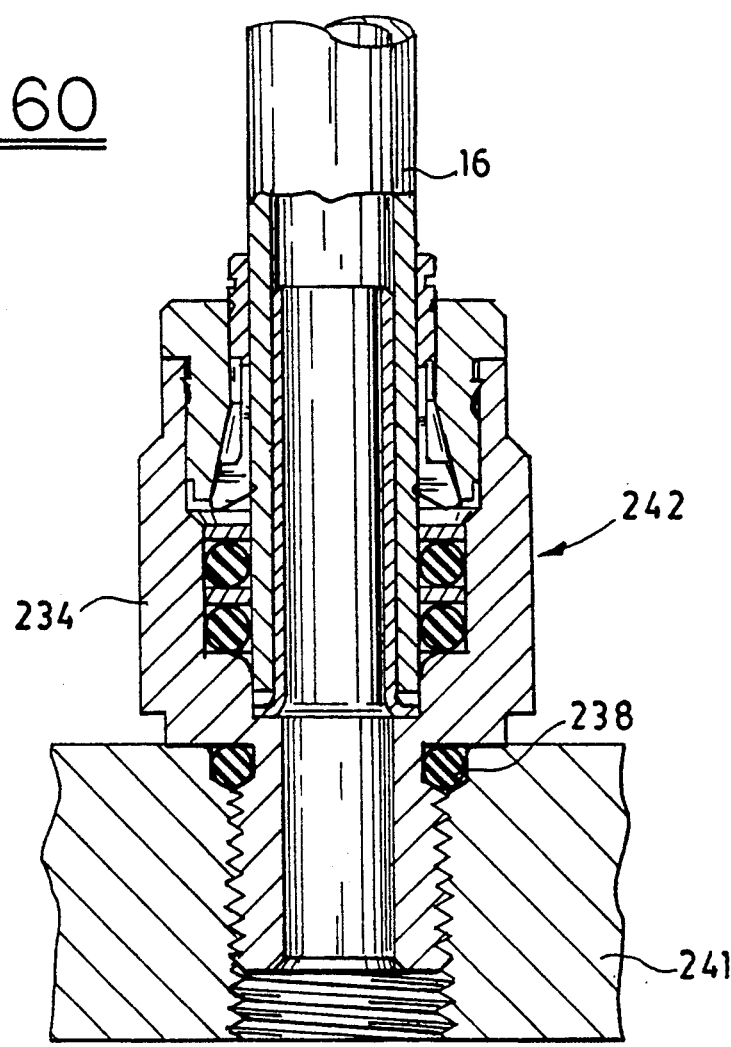
FIG. 60 is a sectional view of a fitting similar to that of FIG. 57.
Figure 61:
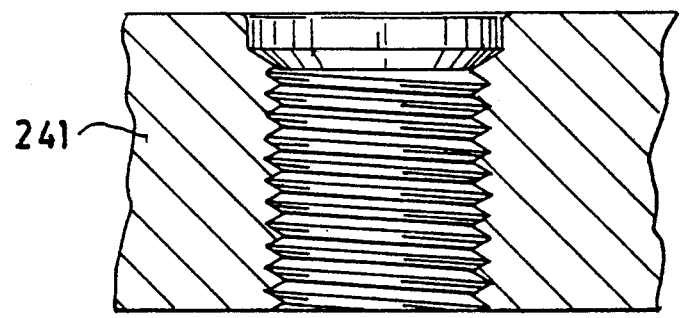
FIG. 61 illustrates a receptacle adapted to receive the fitting of FIG. 60.

In the embodiments illustrated in FIGS. 60 and 61, a fitting is shown which is similar to that illustrated in FIGS. 58 and 59, with the exception that the body comprises external hex 242.

Figure 62:
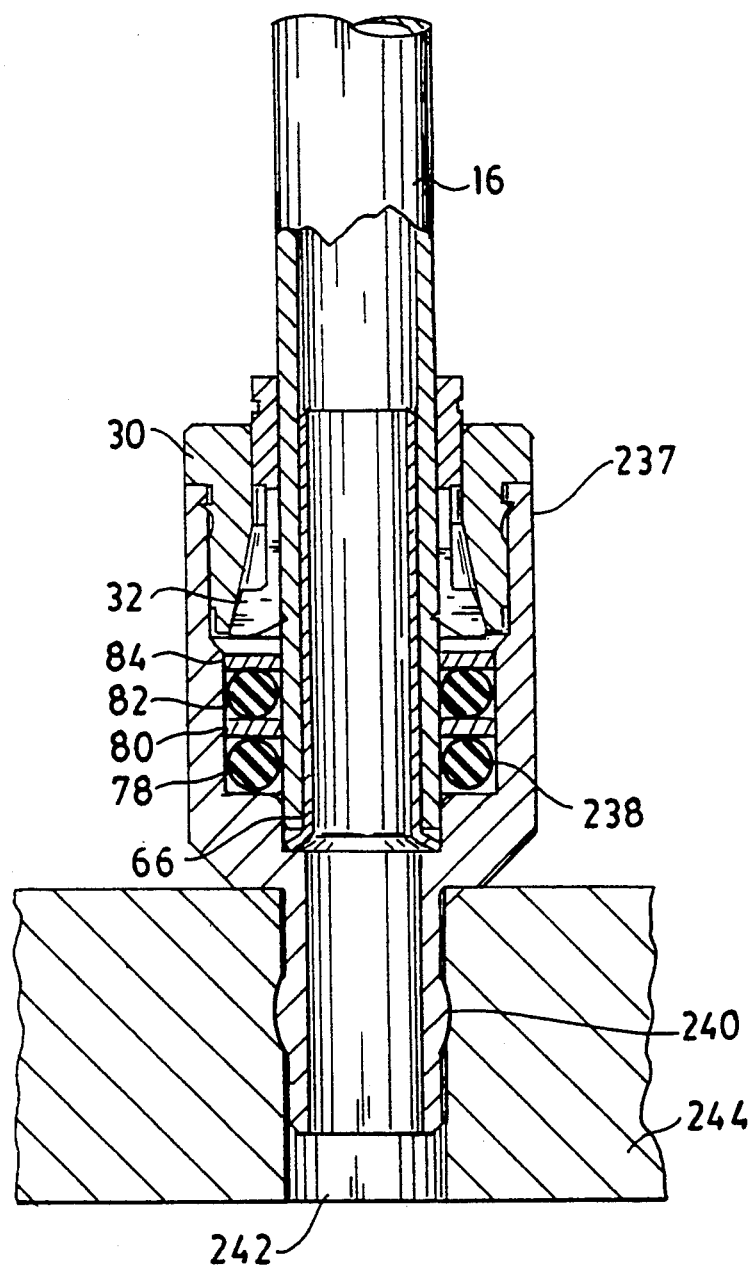
FIG. 62 is a sectional view of a one-piece fitting which is press-fit into a receptacle.

FIG. 62 illustrates a fitting 237 similar to that illustrated in FIGS. 58 and 59 wherein the fitting is disposed within a body 238 comprised of interference fit 240 which is adapted to secure the fitting 237 within cavity 242 of body 244. It is referred that interference fit 240 be configured so that it prevents the passage of fluid through cavity 242.

Figure 63:
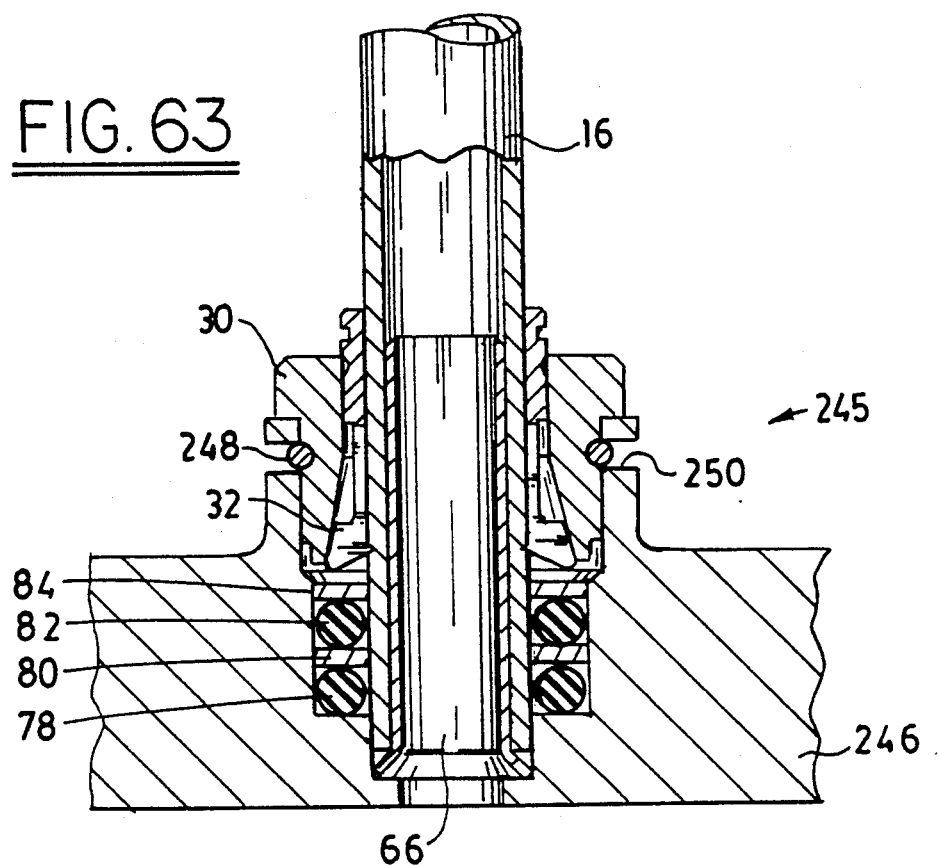
FIG. 63 is a sectional view of a fitting which is clipped into place within a suitable receptacle.
Figure 64:
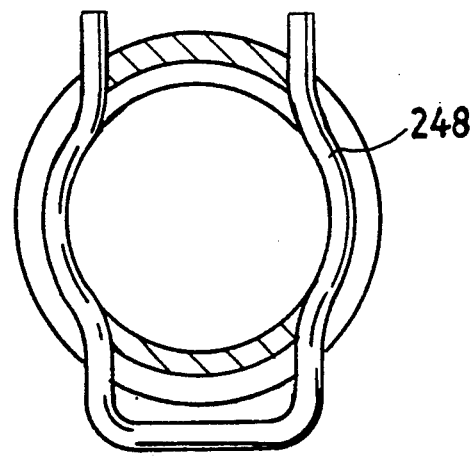
FIG. 64 illustrates a suitable clipping means used with the fitting of FIG. 63.
Figure 65:
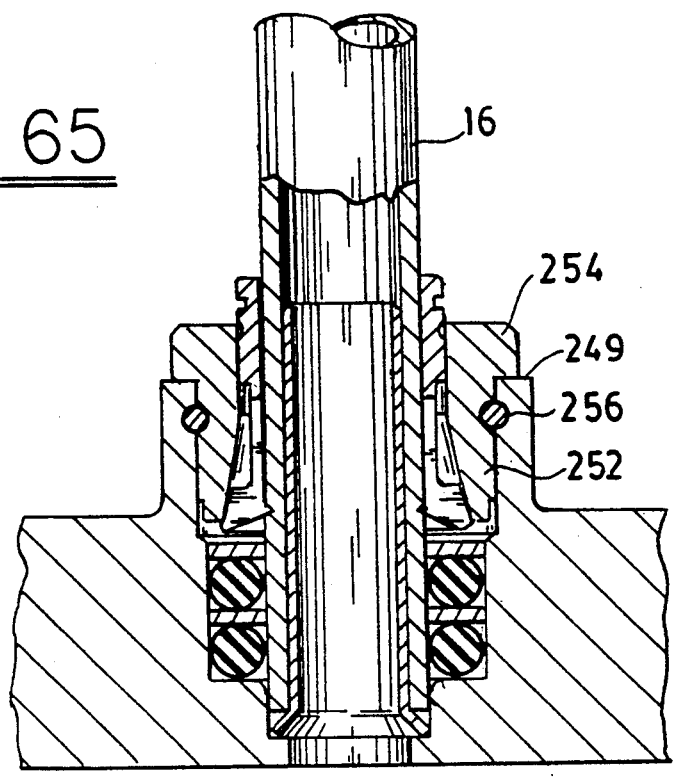
FIGS. 65 and 66 illustrate fitting and clipping means similar to those illustrated in FIGS. 63 and 64, respectively.
Figure 66:
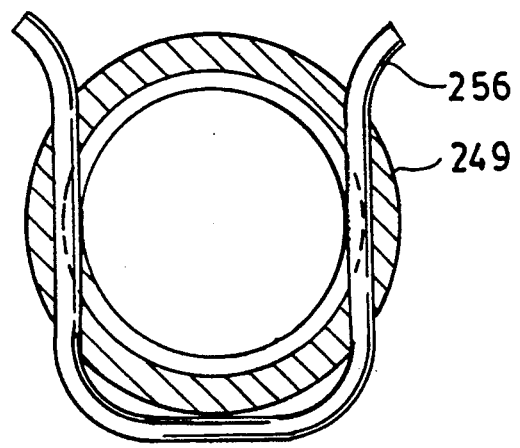

FIGS. 63 and 64 illustrate a removable cartridge 245 which is removably attached to body 246 by clip 248. In the embodiment of FIGS. 63 and 64, clip 248 is disposed within slot 250. By comparison, in the embodiment illustrated in FIGS. 65 and 66, clip 249 is disposed between body 250 and sleeve 254 within annular orifice 256.

The coupling assembly of this invention has properties which are substantially superior to the properties of the prior art coupling assemblies. It meets the requirements set forth by the Department of Transportation standards (as expressed in Motor Vehicle Safety Standard No. 106-74, effective Sep. 1, 1974).

Part 571 of "MOTOR VEHICLE SAFETY STANDARD NO. 106-74" (S 106-74), pages 1-16, was published in the Federal Register, in part or whole, at 38 F.R. No. 31302 (Nov. 13, 1973) 39 F.R. No. 7425 (Feb. 26, 1974), 39 F.R. No. 24012-24015 (Jun. 28, 1974), 39 F.R. 28436 (Aug. 7, 1974), 40 F.R. No. 12088 (Mar. 17, 1975), 40 F.R. 38159 (Aug. 27, 1975), 41 F.R. 28505 (Jul. 12, 1976), 43 F.R. 22362-22364 (May 25, 1978), etc.; the disclosure of each of these publications is hereby incorporated by reference into this specification. This Standard, entitled "Brake Hoses," applies to the hydraulic, air, and vacuum brake hose, brake hose assemblies, and brake hose end fittings used in passenger cars, multipurpose passenger vehicles, trucks, buses, trailers, and motorcycles.

Section S7.3.8 of M.V.S.S. 106-74 requires that an air brake hose assembly shall contain air pressure of 200 pounds per square inch for five minutes without loss of more than 5 pounds per square inch. In the air pressure test (which is described in Section S8.7), the air brake hose assembly is connected to a source of air pressure, 200 p.s.i. air pressure is applied to the hose, and the hose is the sealed from the source of air pressure; after five minutes, the air pressure remaining in the test specimen is determined. The coupling assembly of this invention, when tested in accordance with Section S8.7, passes the test.

Section 7.3.9 of M.V.S.S. 106-74 requires that an air brake assembly shall not rupture when exposed to hydrostatic pressure of 800 p.s.i. The burst strength of the air brake hose assembly is determined in accordance with the test described in section 8.8 of M.V.S.S. 106-74. In this test, the air brake hose assembly is filled in water, allowing all gases to escape; and water pressure is applied at a uniform rate of increase of about 1,000 p.s.i. per minute until the hose ruptures. The coupling assembly of this invention, when tested in accordance with section 8.8, passes this test.

M.V.S.S. section S.7.3.10 specifies that the air brake hose assembly generally shall withstand, without separation of the fitting from the tube, specified tensile loads. If the air brake hose assembly is designed for use between frame and axle, or between a towed and a towing vehicle, it must withstand a pull of either 250 pounds (if it is 0.25" or less in nominal internal diameter) or 325 pounds (if it is larger than 0.25 inches in nominal internal diameter). An air brake assembly designed for use in any other application shall withstand a pull of either 50 pounds (if it is 0.25" or less in nominal internal diameter), 150 pounds (if it is 0.375" or 0.5" in nominal internal diameter), or 325 pounds (if it is larger than 0.5" in nominal internal diameter). The tensile test is conducted in accordance with section 8.9 of M.V.S.S. 106-74. In this test, a tension testing machine conforming to the requirements of the Methods of Verification of Testing Machines (1964 American Society for Testing and Materials, Designation E4) and provided with a recording device to register total pull in pounds is used. The air brake hose assembly is attached to the testing machine to permit straight, even, machine-pull on the hose, and tension is applied at a rate of 1 inch per minute travel of the moving head until separation occurs. The coupling of this invention, when tested in accordance with section 8.9, passes the test.

M.V.S.S. Section 7.3.11 requires that the coupling should have a specified water absorption and tensile strength. After immersion of the coupling in distilled water for 70 hours, the air brake hose assemblies shall withstand, without separation of the fitting from the tubing, a tensile load of either 50 pounds (if it is 0.25" or less in nominal internal diameter), 150 pounds (if it is 0.375" or 0.5" in nominal internal diameter), or 325 pounds (if it is larger than 0.5" in nominal internal diameter). The tensile test of the coupling is conducted in accordance with the test described in section 8.9 of M.V.S.S. 106-74, described above. The coupling of this invention, when tested in accordance with section 8.9 for its water absorption and tensile strength, passes this test.

The corrosion resistance of the end fitting of the coupling may be tested in accordance with A.S.T.M. test B117-64, and section S5.3.11 of M.V.S.S. 106-74. In this test, the fitting is exposed to 24 hours of salt spray. After such spray, the brake hose end fitting should show no base metal corrosion on the end fitting surface except where crimping or the application of labeling information has caused displacement of the protective coating. The coupling of this invention, when tested in accordance with A.S.T.M. B117-64, passes this test.

The fitting of this invention not only passes the aforementioned tests at "time zero," but also passes the tests after extended use in its desired environment. The service life of applicants' fitting is substantially greater than the service life of prior art fittings.

Not only does applicants' fitting have a superior service life, but it also has a superior reliability. The properties of applicants' fitting, as measured by the aforementioned tests, vary less after extended periods of use than do the properties of prior art fittings.

The leak rate of applicant's fitting at relatively high temperatures and relatively low temperatures is substantially lower than prior art fittings. The leak rate test is conducted in accordance with SAE Standard J1131. In this test, the tube 16 is connected to the fitting and, allowing 0.5" slack, the tube and fitting is mounted in a vibration machine. One end of the fitting is oscillated at about 600 (plus or minus 20) cycles per minute through a total stroke of 0.5" for a total of about 1,000,000 (plus or minus 50,000) cycles while maintaining internal pressure of about 120 (plus or minus 10) p.si.g., using dry air. When the test is started, it is conducted while the sample is at a temperature of about 220 (plus or minus 5) degrees Fahrenheit. The test temperature is varied every 250,000 cycles, going from about 220 degrees Fahrenheit to about $-40$ (plus or minus 5) degrees Fahrenheit, and then back to about 220 degrees Fahrenheit.

During and after the test a mass flowmeter is used to test for leakage. If leakage exceeds 50 cubic centimeters per minute at about $-40$ degrees Fahrenheit, or if it exceeds 25 cubic centimeters per minute at about 70 (plus or minus 5 degrees Fahrenheit), the test specimen fails the test.

There is yet another leak rate test which applicants' fitting passes. In this test, referred to as the "SERVICEABILITY TEST" in SAE Standard J1131, the fitting and tubing are connected and disconnected for at least 5 times; the tubing specimens used in the test are cut to obtain a length of 12.0 inches between fittings after assembly. After the fifth reassembly, the test specimen is pressured with air to about 120 (plus or minus 10) p.s.i.g. at about 75 (plus or minus 5) degrees Fahrenheit, and it is tested for leakage with the mass flowmeter. The leak rate must not exceed 25 cubic centimeters per minute.

The preferred embodiment of applicants' fitting passes a "HOT PULL TEST," which also is described in SAE J1131. In this test, a tubing is connected to the fitting to be tested. The fitting, together with from 4.0–4.25 inches of the tubing, is submerged below the surface of water so that the outside diameter is exposed to the water. The water is heated to boiling and maintained at boiling from 5.0–5.5 minutes. While the water is being so heated, the tubing is submitted to tensile load (by a tensile machine) at a rate of pull of 1.0 inch per minute. The tensile load used shall be either 15 pounds (for ⅛" o.d. tubing), or 50 pounds (for ¼" o.d. tubing), or 150 pounds (for ⅜" o.d. tubing), or 200 pounds (for ½" o.d. tubing). To pass the test, the test specimen must either elongate at least 50 percent, or withstand the load described above, without causing separation from the fitting.

In one embodiment, the elastomeric sealing means used in applicants' fitting has a cross-section which is not substantially circular. Thus, for example, such cross-section may be substantially U-shaped, substantially V-shaped, ribbed shape, and the like. In one aspect of this embodiment, only one such elastomeric sealing means is used.

It is to be understood that the aforementioned description is illustrative only and that changes can be made n the apparatus, in the ingredients and their proportions, and in the sequence of combinations and process steps, as well as in other aspects of the invention discussed herein, without departing from the scope of the invention as defined in the following claims.

I claim:

1. A releasable coupling for a tube comprised of an interior wall, wherein said coupling comprises:
   (a) a body comprising a cavity;
   (b) mounting means disposed first, second, third, and fourth concentric, stepped bores, wherein:
      1. the diameter of said first bore is larger than the diameter of said second bore, the diameter of said second bore is larger than the diameter of third bore, and the diameter of said third bore is larger than the diameter of said fourth bore;
      2. each of said first, second, third, and fourth stepped bores is comprised of a step defined by the intersection of two intersecting surfaces;
   (b) compression means for compressing said tube, wherein:
      1. said compression means is disposed within said first bore,
      2. said compression means has an inner surface inclined to the axis of said first bore;
   (c) a clamping member mounted within said compression means for axial movement relative to said compression means and having a bore slightly larger than the diameter of said tube, wherein said clamping member comprises at least six flexible jaws and means on said jaws cooperating with said inner inclined surface to drive said jaws inwardly upon relative axial movement between said compression means and said jaws;
   (d) tube support means for supporting at least a portion of said interior wall of said tube, wherein said tube support means is substantially cylindrical and is comprised of a flanged head and a bore;
   (e) at least a first annular, concentric, elastomeric resilient sealing means, a second annular, concentric elastomeric resilient sealing means, a first, annular concentric washer, and a second, annular, concentric washer, wherein:
      1. each of said first sealing means, said first concentric washer, and said second sealing means is disposed within said second bore and is free to move axially within said second bore,
      2. said second concentric washer is disposed within said first bore and is retained by means disposed within said first bore, and
      3. said second concentric washer has an outer diameter which is larger than the outer diameter of said first concentric washer.

2. The releasable coupling as recited in claim 1, wherein said body consists essentially of brass.

3. The releasable coupling as recited in claim 1, wherein said coupling is comprised of a cover which is removably attached to said body.

4. The releasable coupling as recited in claim 3, wherein said coupling is comprised of means for disconnecting said tube from said coupling.

5. The releasable coupling as recited in claim 4, wherein said means for disconnecting said tube from said coupling is comprised of a manual release button.

6. The releasable coupling as recited in claim 5, wherein said manual release button is operatively connected to said compression means.

7. The releasable coupling as recited in claim 1, wherein said tube support is movably disposed within said third bore.

8. The releasable coupling as recited in claim 7, wherein said body consists essentially of brass.

9. The releasable coupling as recited in claim 1, wherein said coupling is comprised of means for disconnecting said tube from said coupling.

10. The releasably coupling as recited in claim 9, wherein said means for disconnecting said tube from said coupling is comprised of a manual release button.

11. The releasable coupling as recited in claim 10, wherein said manual release button is operatively connected to said compression means.

12. The releasable coupling as recited in claim 9, wherein said coupling is comprised of a cover which is removably attached to said body.

13. The releasable coupling as recited in claim 1, wherein said coupling is comprised of a forged connector body.

14. The releasable coupling as recited in claim 1, wherein said coupling is comprised of an extruded connector body.

15. The releasable coupling as recited in claim 14, wherein said extruded connector body is metallic.

16. The releasable coupling as recited in claim 14, wherein said extruded connector body is plastic.

* * * * *